US012738535B2

(12) United States Patent
Matsuo et al.

(10) Patent No.: US 12,738,535 B2
(45) Date of Patent: Sep. 15, 2026

(54) BINDER COMPOSITION FOR ALL-SOLID-STATE SECONDARY BATTERY, SLURRY COMPOSITION FOR ALL-SOLID-STATE SECONDARY BATTERY ELECTRODE MIXED MATERIAL LAYER, SLURRY COMPOSITION FOR ALL-SOLID-STATE SECONDARY BATTERY SOLID ELECTROLYTE LAYER, ELECTRODE FOR ALL-SOLID-STATE SECONDARY BATTERY, SOLID ELECTROLYTE LAYER FOR ALL-SOLID-STATE SECONDARY BATTERY, AND ALL-SOLID-STATE SECONDARY BATTERY

(71) Applicant: ZEON CORPORATION, Tokyo (JP)

(72) Inventors: Yusaku Matsuo, Tokyo (JP); Taku Matsumura, Tokyo (JP); Kouichirou Maeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 908 days.

(21) Appl. No.: 17/271,595

(22) PCT Filed: Aug. 22, 2019

(86) PCT No.: PCT/JP2019/032835

§ 371 (c)(1),
(2) Date: Feb. 26, 2021

(87) PCT Pub. No.: WO2020/045227

PCT Pub. Date: Mar. 5, 2020

(65) Prior Publication Data

US 2021/0344043 A1 Nov. 4, 2021

(30) Foreign Application Priority Data

Aug. 31, 2018 (JP) ................................ 2018-163944

(51) Int. Cl.
*H01M 10/0565* (2010.01)
*H01M 4/62* (2006.01)
*H01M 10/0562* (2010.01)

(52) U.S. Cl.
CPC ....... *H01M 10/0565* (2013.01); *H01M 4/622* (2013.01); *H01M 10/0562* (2013.01); *H01M 2300/0068* (2013.01); *H01M 2300/0082* (2013.01)

(58) Field of Classification Search
CPC ................................................ H01M 10/0565
See application file for complete search history.

(56) References Cited

U.S. PATENT DOCUMENTS

| | | | | |
|---|---|---|---|---|
| 10,388,961 | B2 | 8/2019 | Fukumine et al. | |
| 2008/0003506 | A1* | 1/2008 | Suzuki | |
| 2011/0081601 | A1* | 4/2011 | Weber | |
| 2015/0050554 | A1* | 2/2015 | Fukumine | H01M 4/0416 252/182.1 |
| 2017/0179468 | A1* | 6/2017 | Fanous | H01M 4/137 |
| 2018/0062162 | A1* | 3/2018 | Maeda | |

FOREIGN PATENT DOCUMENTS

| | | | | | |
|---|---|---|---|---|---|
| CN | 103026535 | A | | 4/2013 | |
| CN | 105612641 | A | | 5/2016 | |
| CN | 107710469 | A | | 2/2018 | |
| CN | 107710472 | A | | 2/2018 | |
| EP | 3644419 | A1 | | 4/2020 | |
| EP | 3817107 | A1 | | 5/2021 | |
| EP | 3817108 | A1 | | 5/2021 | |
| JP | 2004227974 | A | | 8/2004 | |
| JP | 2010205449 | A | | 9/2010 | |
| JP | 2016181471 | A | | 10/2016 | |
| KR | 20160136089 | A | * | 11/2016 | H01M 2/1686 |
| KR | 1020180041091 | A | | 4/2018 | |
| WO | 2012026583 | A1 | | 3/2012 | |
| WO | WO-2015151501 | A1 | * | 10/2015 | H01M 4/623 |
| WO | WO-2016152262 | A1 | * | 9/2016 | H01M 10/052 |
| WO | WO-2017033600 | A1 | * | 3/2017 | H01M 10/0562 |

OTHER PUBLICATIONS

Kim Ji Eun, et. al., EPO Translation of KR 20160136089 A "A Separator Having an Electrode Bonding Layer and A Secondary battery Comprising the Same," Espacenet, 1-10 (Year: 2016).*
May 13, 2022, the Extended European Search Report issued by the European Patent Office in the corresponding European Patent Application No. 19854328.2.
Oct. 15, 2019, International Search Report issued in the International Patent Application No. PCT/JP2019/032835.
Mar. 2, 2021, International Preliminary Report on Patentability issued in the International Patent Application No. PCT/JP2019/032835.

* cited by examiner

*Primary Examiner* — Nicole M. Buie-Hatcher
*Assistant Examiner* — Krishna R Hammond
(74) *Attorney, Agent, or Firm* — KENJA IP LAW PC

(57) ABSTRACT

Provided is a binder composition for an all-solid-state secondary battery with which it is possible to produce a slurry composition for a solid electrolyte-containing layer having good leveling performance and to form a solid electrolyte-containing layer that can cause an all-solid-state secondary battery to display excellent output characteristics. The binder composition for an all-solid-state secondary battery contains a first polymer, a second polymer, and a solvent. The first polymer is poorly soluble in the solvent. The second polymer includes a nitrile group-containing monomer unit and is highly soluble in the solvent.

10 Claims, No Drawings

BINDER COMPOSITION FOR ALL-SOLID-STATE SECONDARY BATTERY, SLURRY COMPOSITION FOR ALL-SOLID-STATE SECONDARY BATTERY ELECTRODE MIXED MATERIAL LAYER, SLURRY COMPOSITION FOR ALL-SOLID-STATE SECONDARY BATTERY SOLID ELECTROLYTE LAYER, ELECTRODE FOR ALL-SOLID-STATE SECONDARY BATTERY, SOLID ELECTROLYTE LAYER FOR ALL-SOLID-STATE SECONDARY BATTERY, AND ALL-SOLID-STATE SECONDARY BATTERY

TECHNICAL FIELD

The present disclosure relates to a binder composition for an all-solid-state secondary battery, a slurry composition for an all-solid-state secondary battery electrode mixed material layer, a slurry composition for an all-solid-state secondary battery solid electrolyte layer, an electrode for an all-solid-state secondary battery, a solid electrolyte layer for an all-solid-state secondary battery, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

All-solid-state secondary batteries in which a solid electrolyte is used instead of an organic solvent electrolyte having high flammability and high danger of ignition upon leakage are attracting attention as secondary batteries having high safety. A solid electrolyte may be contained inside an all-solid-state secondary battery as a solid electrolyte-containing layer (electrode mixed material layer and/or solid electrolyte layer) formed by binding components such as the solid electrolyte through a binder, for example.

In a typical all-solid-state secondary battery, a solid electrolyte layer is arranged between electrodes (positive electrode and negative electrode) that each include an electrode mixed material layer on a current collector. Moreover, a solid electrolyte-containing layer such as an electrode mixed material layer or a solid electrolyte layer is produced using a binder composition for an all-solid-state secondary battery that contains a polymer as a binder. More specifically, the formation of a solid electrolyte-containing layer is carried out using a slurry composition for a solid electrolyte-containing layer that is produced using a binder composition.

An electrode mixed material layer can be formed by drying a slurry composition for an all-solid-state secondary battery electrode mixed material layer (hereinafter, also referred to simply as a "slurry composition for an electrode mixed material layer") that contains a binder composition, a solid electrolyte, and an electrode active material, for example. Moreover, a solid electrolyte layer can be formed by drying a slurry composition for an all-solid-state secondary battery solid electrolyte layer (hereinafter, also referred to simply as a "slurry composition for a solid electrolyte layer") that contains a binder composition and a solid electrolyte, for example.

Attempts have been made to improve the performance of all-solid-state secondary batteries through improvement of binders contained in binder compositions.

In one specific example, Patent Literature (PTL) 1 discloses that by using a binder composition containing a polymer having a gel structure as a binder and by also using two types of solid electrolyte particles having different particle diameters in formation of a solid electrolyte layer having a thickness within a specific range, charge/discharge characteristics of an all-solid-state secondary battery that includes the solid electrolyte layer are enhanced.

CITATION LIST

Patent Literature

PTL 1: JP2016-181471A

SUMMARY

Technical Problem

However, during application a slurry composition for a solid electrolyte-containing layer produced using the conventional binder composition described above in order to form a solid electrolyte-containing layer, there have been instances in which smoothness of a coating film of the slurry composition for a solid electrolyte-containing layer has been lost and formation of a solid electrolyte-containing layer of uniform thickness has been difficult (i.e., there have been instances in which leveling performance of the slurry composition for a solid electrolyte-containing layer has decreased). There is also room for improvement of the conventional binder composition described above in terms of improving output characteristics of an all-solid-state secondary battery.

Accordingly, one object of the present disclosure is to provide a binder composition for an all-solid-state secondary battery with which it is possible to produce a slurry composition for a solid electrolyte-containing layer having good leveling performance and to form a solid electrolyte-containing layer that can cause an all-solid-state secondary battery to display excellent output characteristics.

Another object of the present disclosure is to provide a slurry composition for an all-solid-state secondary battery electrode mixed material layer that has good leveling performance and with which it is possible to form an electrode mixed material layer that can cause an all-solid-state secondary battery to display excellent output characteristics.

Another object of the present disclosure is to provide a slurry composition for an all-solid-state secondary battery solid electrolyte layer that has good leveling performance and with which it is possible to form a solid electrolyte layer that can cause an all-solid-state secondary battery to display excellent output characteristics.

Another object of the present disclosure is to provide an electrode for an all-solid-state secondary battery and a solid electrolyte layer for an all-solid-state secondary battery that can cause an all-solid-state secondary battery to display excellent output characteristics.

Another object of the present disclosure is to provide an all-solid-state secondary battery having excellent output characteristics.

Solution to Problem

The inventors conducted diligent investigation with the aim of solving the problems set forth above. The inventors discovered that by using a binder composition containing a solvent and two specific types of polymers, it is possible to improve leveling performance of a slurry composition for a solid electrolyte-containing layer produced using the binder composition and to cause an all-solid-state secondary battery to display excellent output characteristics, and, in this manner, completed the present disclosure.

Specifically, the present disclosure aims to advantageously solve the problems set forth above, and a presently disclosed binder composition for an all-solid-state secondary battery comprises a first polymer, a second polymer, and a solvent, wherein the first polymer is poorly soluble in the solvent, and the second polymer includes a nitrile group-containing monomer unit and is highly soluble in the solvent. By using a binder composition that contains, in a solvent, a first polymer that is poorly soluble in the solvent and a second polymer that is highly soluble in the solvent and includes a nitrile group-containing monomer unit in this manner, it is possible to produce a slurry composition for a solid electrolyte-containing layer (slurry composition for an electrode mixed material layer or slurry composition for a solid electrolyte layer) having good leveling performance and to form a solid electrolyte-containing layer (electrode mixed material layer or solid electrolyte layer) that can cause an all-solid-state secondary battery to display excellent output characteristics.

Note that when a polymer is said to be "poorly soluble" in a solvent in the present disclosure, this means that the "amount of solvent-insoluble content" measured by a method described in the EXAMPLES section of the present specification is 50 mass % or more, whereas, when a polymer is said to be "highly soluble", this means that the "amount of solvent-insoluble content" is less than 50 mass %.

Moreover, the phrase "includes a monomer unit" as used in the present disclosure means that "a polymer obtained with the monomer includes a repeating unit derived from the monomer".

In the presently disclosed binder composition for an all-solid-state secondary battery, the first polymer preferably constitutes a proportion of not less than 10 mass % and not more than 90 mass % among a total of the first polymer and the second polymer. When the proportion constituted by the first polymer among the total of the first polymer and the second polymer is within the range set forth above, leveling performance of a slurry composition for a solid electrolyte-containing layer can be further improved while also even further enhancing output characteristics of an all-solid-state secondary battery.

In the presently disclosed binder composition for an all-solid-state secondary battery, proportional content of the nitrile group-containing monomer unit in the second polymer is preferably not less than 5 mass % and not more than 30 mass %. When the proportional content of the nitrile group-containing monomer unit in the second polymer is within the range set forth above, leveling performance of a slurry composition for a solid electrolyte-containing layer can be further improved while also even further enhancing output characteristics of an all-solid-state secondary battery. Note that in the present disclosure, the proportion in which a polymer includes each constituent repeating unit (monomer unit) thereof can be measured by a nuclear magnetic resonance (NMR) method such as $^{1}H$-NMR or $^{13}C$-NMR.

In the presently disclosed binder composition for an all-solid-state secondary battery, the solvent preferably includes either or both of xylene and butyl butyrate. By using a binder composition containing xylene and/or butyl butyrate as the solvent, leveling characteristics of a slurry composition for a solid electrolyte-containing layer can be further improved, and ion conductivity of a solid electrolyte-containing layer can be increased while also even further improving output characteristics of an all-solid-state secondary battery.

Moreover, the present disclosure aims to advantageously solve the problems set forth above, and a presently disclosed slurry composition for an all-solid-state secondary battery electrode mixed material layer comprises: a solid electrolyte; an electrode active material; and any one of the binder compositions for an all-solid-state secondary battery set forth above. A slurry composition for an electrode mixed material layer that contains a solid electrolyte, an electrode active material, and any one of the binder compositions set forth above in this manner has good leveling performance and makes it possible to form an electrode mixed material layer that can cause an all-solid-state secondary battery to display excellent output characteristics.

Furthermore, the present disclosure aims to advantageously solve the problems set forth above, and a presently disclosed slurry composition for an all-solid-state secondary battery solid electrolyte layer comprises: a solid electrolyte; and any one of the binder compositions for an all-solid-state secondary battery set forth above. A slurry composition for a solid electrolyte layer that contains a solid electrolyte and any one of the binder compositions set forth above in this manner has good leveling performance and makes it possible to form a solid electrolyte layer that can cause an all-solid-state secondary battery to display excellent output characteristics.

Also, the present disclosure aims to advantageously solve the problems set forth above, and a presently disclosed electrode for an all-solid-state secondary battery comprises an electrode mixed material layer formed using the slurry composition for an all-solid-state secondary battery electrode mixed material layer set forth above. An electrode that includes an electrode mixed material layer formed from the slurry composition for an electrode mixed material layer set forth above in this manner can cause an all-solid-state secondary battery to display excellent output characteristics.

Moreover, the present disclosure aims to advantageously solve the problems set forth above, and a presently disclosed solid electrolyte layer for an all-solid-state secondary battery is formed using the slurry composition for an all-solid-state secondary battery solid electrolyte layer set forth above. A solid electrolyte layer that is formed from the slurry composition for a solid electrolyte layer set forth above in this manner can cause an all-solid-state secondary battery to display excellent output characteristics.

Furthermore, the present disclosure aims to advantageously solve the problems set forth above, and a presently disclosed all-solid-state secondary battery comprises either or both of: the electrode for an all-solid-state secondary battery set forth above; and the solid electrolyte layer for an all-solid-state secondary battery set forth above. By forming either or both of these solid electrolyte-containing layers using a slurry composition for a solid electrolyte-containing layer that contains the binder composition set forth above in this manner, the all-solid-state secondary battery can be caused to display excellent output characteristics.

Advantageous Effect

According to the present disclosure, it is possible to provide a binder composition for an all-solid-state secondary battery with which it is possible to produce a slurry composition for a solid electrolyte-containing layer having good leveling performance and to form a solid electrolyte-containing layer that can cause an all-solid-state secondary battery to display excellent output characteristics.

Moreover, according to the present disclosure, it is possible to provide a slurry composition for an all-solid-state secondary battery electrode mixed material layer that has good leveling performance and with which it is possible to form an electrode mixed material layer that can cause an all-solid-state secondary battery to display excellent output characteristics.

Furthermore, according to the present disclosure, it is possible to provide a slurry composition for an all-solid-state secondary battery solid electrolyte layer that has good leveling performance and with which it is possible to form a solid electrolyte layer that can cause an all-solid-state secondary battery to display excellent output characteristics.

Also, according to the present disclosure, it is possible to provide an electrode for an all-solid-state secondary battery and a solid electrolyte layer for an all-solid-state secondary battery that can cause an all-solid-state secondary battery to display excellent output characteristics.

Moreover, according to the present disclosure, it is possible to provide an all-solid-state secondary battery having excellent output characteristics.

DETAILED DESCRIPTION

The following provides a detailed description of embodiments of the present disclosure.

The presently disclosed binder composition for an all-solid-state secondary battery can be used in production of an all-solid-state secondary battery. For example, the presently disclosed binder composition for an all-solid-state secondary battery can be used in production of a slurry composition for a solid electrolyte-containing layer (slurry composition for an all-solid-state secondary battery electrode mixed material layer and/or slurry composition for an all-solid-state secondary battery solid electrolyte layer) that is used to produce a solid electrolyte-containing layer (electrode mixed material layer and/or solid electrolyte layer) included in an all-solid-state secondary battery. Moreover, the presently disclosed slurry composition for an all-solid-state secondary battery electrode mixed material layer contains the presently disclosed binder composition for an all-solid-state secondary battery and can be used in formation of an electrode mixed material layer. Furthermore, the presently disclosed slurry composition for an all-solid-state secondary battery solid electrolyte layer contains the presently disclosed binder composition for an all-solid-state secondary battery and can be used in formation of a solid electrolyte layer. Also, the presently disclosed electrode for an all-solid-state secondary battery can be produced using the presently disclosed slurry composition for an all-solid-state secondary battery electrode mixed material layer. Moreover, the presently disclosed solid electrolyte layer for an all-solid-state secondary battery can be produced using the presently disclosed slurry composition for an all-solid-state secondary battery solid electrolyte layer. Furthermore, the presently disclosed all-solid-state secondary battery includes the presently disclosed electrode for an all-solid-state secondary battery and/or the presently disclosed solid electrolyte layer for an all-solid-state secondary battery.

(Binder Composition for all-Solid-State Secondary Battery)

The presently disclosed binder composition contains at least a first polymer, a second polymer, and a solvent and can optionally further contain other components. In the presently disclosed binder composition, the first polymer is poorly soluble in the solvent, whereas the second polymer is highly soluble in the solvent. Moreover, the second polymer includes a nitrile group-containing monomer unit.

Through the binder composition containing the first polymer and the second polymer set forth above in a solvent, it is possible to produce a slurry composition for a solid electrolyte-containing layer having good leveling performance and to form a solid electrolyte-containing layer that can cause an all-solid-state secondary battery to display excellent output characteristics.

Although it is not clear why leveling performance of a slurry composition for a solid electrolyte-containing layer can be increased and output characteristics of an all-solid-state secondary battery can be improved by using the presently disclosed binder composition, the reason for this is presumed to be as follows.

Specifically, the first polymer contained in the presently disclosed binder composition is poorly soluble in the solvent of the binder composition, and thus normally displays a particulate form and is dispersed as fine particles in the solvent. Consequently, the first polymer becomes interposed between dispersed components such as a solid electrolyte and/or an electrode active material in a slurry composition for a solid electrolyte-containing layer produced using the binder composition and can thereby inhibit physical contact and aggregation of these dispersed components. On the other hand, the second polymer contained in the presently disclosed binder composition is highly soluble in the solvent of the binder composition, and thus molecular chains thereof spread out sufficiently in a slurry composition for a solid electrolyte-containing layer produced using the binder composition, and suitable viscosity can be imparted to the slurry composition for a solid electrolyte-containing layer. Moreover, as a result of the second polymer including a nitrile group-containing monomer unit, the second polymer can adsorb well to a solid electrolyte via a nitrile group and can increase dispersibility of the solid electrolyte in a slurry composition for a solid electrolyte-containing layer.

In this manner, the presently disclosed binder composition can increase leveling performance of a slurry composition for a solid electrolyte-containing layer through a combination of contributions of the first polymer that can inhibit aggregation of dispersed components and the second polymer that can impart suitable viscosity to the slurry composition for a solid electrolyte-containing layer while also improving dispersibility of a solid electrolyte. Moreover, through a slurry composition for a solid electrolyte-containing layer having good leveling performance that is produced using the presently disclosed binder composition, it is possible to obtain a solid electrolyte-containing layer having a solid electrolyte distributed well throughout the layer and having excellent ion conductivity, and thus output characteristics of an all-solid-state secondary battery that includes this solid electrolyte-containing layer can be improved.

<First Polymer>

The first polymer is poorly soluble in the solvent contained in the presently disclosed binder composition. Note that the presently disclosed binder composition may contain one polymer as the first polymer or may contain two or more polymers as the first polymer.

<<Amount of Solvent-Insoluble Content>>

The amount of solvent-insoluble content in the first polymer is required to be not less than 50 mass % and not more than 100 mass % (i.e., the first polymer is poorly soluble in the solvent), is preferably 60 mass % or more, more preferably 70 mass % or more, and even more preferably 90 mass % or more, and is preferably 99 mass % or less, and more preferably 98 mass % or less. When the amount of solvent-insoluble content in the first polymer is less than 50 mass %, aggregation of a solid electrolyte and/or an electrode active material cannot be inhibited, and leveling performance of a slurry composition for a solid electrolyte-containing layer cannot be sufficiently increased. Moreover, output characteristics of an all-solid-state secondary battery that includes a solid electrolyte-containing layer formed using the slurry composition for a solid electrolyte-containing layer deteriorate. On the other hand, when the amount of solvent-insoluble content in the first polymer is 99 mass % or less, the first polymer can function well as a binder having sufficient binding capacity and can contribute to improving adhesiveness of a solid electrolyte-containing layer. Consequently, output characteristics of an all-solid-state secondary battery that includes the solid electrolyte-containing layer can be further improved.

Note that the "amount of solvent-insoluble content" in a polymer such as the first polymer or the second polymer can be adjusted by altering the types and amounts of monomers used to produce the polymer, the type and amount of a molecular weight modifier used to produce the polymer, and the polymerization conditions such as the reaction temperature and the reaction time.

<<Volume-Average Particle Diameter in Solvent>>

The volume-average particle diameter of the first polymer in the solvent is preferably not less than 100 nm and not more than 1 μm. When the volume-average particle diameter of the first polymer in the solvent is 100 nm or more, sufficient size of the first polymer is ensured such that the first polymer can suitably function as a steric hinderance and thereby well inhibit physical contact and aggregation of dispersed components such as a solid electrolyte and/or an electrode active material. On the other hand, when the volume-average particle diameter of the first polymer in the solvent is 1 μm or less, a sufficient number of particles of the first polymer per unit mass thereof is ensured, and thus physical contact and aggregation of dispersed components such as a solid electrolyte and/or an electrode active material can be well inhibited. Therefore, leveling performance of a slurry composition for a solid electrolyte-containing layer can be further increased while also even further improving output characteristics of an all-solid-state secondary battery through the volume-average particle diameter of the first polymer in the solvent being within the range set forth above.

The "volume-average particle diameter in the solvent" referred to in the present disclosure can be measured by a method described in the EXAMPLES section of the present specification.

<<Chemical Composition>>

Although no specific limitations are placed on the chemical composition of the first polymer so long as the first polymer is poorly soluble in the solvent, the first polymer is preferably a polymer that includes an ethylenically unsaturated carboxylic acid ester monomer unit (hereinafter, also referred to as an "ester polymer") from a viewpoint of sufficiently inhibiting aggregation of a solid electrolyte and an electrode active material and also imparting flexibility and adhesiveness to a solid electrolyte-containing layer, and further improving output characteristics of an all-solid-state secondary battery that includes the solid electrolyte-containing layer. Although the following describes the chemical composition of the first polymer using a case in which the first polymer is an ester polymer as one example, the present disclosure is not limited thereto.

[Ethylenically Unsaturated Carboxylic Acid Ester Monomer Unit]

Examples of ethylenically unsaturated carboxylic acid ester monomers that can form an ethylenically unsaturated carboxylic acid ester monomer unit include a monomer formed of an ester of an ethylenically unsaturated monocarboxylic acid and a monomer formed of a diester of an ethylenically unsaturated dicarboxylic acid.

The monomer formed of an ester of an ethylenically unsaturated monocarboxylic acid may be a (meth)acrylic acid ester monomer, for example. Note that in the present disclosure, "(meth)acryl" is used to indicate "acryl" and/or "methacryl".

Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate.

The monomer formed of a diester of an ethylenically unsaturated dicarboxylic acid may be a maleic acid dialkyl ester such as diethyl maleate or dibutyl maleate; a fumaric acid dialkyl ester such as diethyl fumarate or dibutyl fumarate; an itaconic acid dialkyl ester such as diethyl itaconate or dibutyl itaconate; or the like.

Of these ethylenically unsaturated carboxylic acid ester monomers, 2-ethylhexyl acrylate, n-butyl acrylate, ethyl acrylate, dibutyl itaconate, dibutyl maleate, and dibutyl fumarate are preferable from a viewpoint of further improving output characteristics of an all-solid-state secondary battery. Note that one ethylenically unsaturated carboxylic acid ester monomer may be used individually, or two or more ethylenically unsaturated carboxylic acid ester monomers may be used in combination in a freely selected ratio.

The proportional content of the ethylenically unsaturated carboxylic acid ester monomer unit in the first polymer when the amount of all repeating units included in the first polymer is taken to be 100 mass % is preferably 50 mass % or more, more preferably 60 mass % or more, even more preferably 70 mass % or more, and particularly preferably 80 mass % or more, and is preferably 99 mass % or less, more preferably 95 mass % or less, and even more preferably 90 mass % or less. When the proportional content of the ethylenically unsaturated carboxylic acid ester monomer unit in the first polymer is 50 mass % or more, sufficient adhesiveness and flexibility of a solid electrolyte-containing layer can be ensured, and output characteristics of an all-solid-state secondary battery that includes the solid electrolyte-containing layer can be further improved. On the other hand, when the proportional content of the ethylenically unsaturated carboxylic acid ester monomer unit in the first polymer is 99 mass % or less, affinity with the solvent of the binder composition is not excessively high, the amount of solvent-insoluble content can be ensured, and leveling performance of a slurry composition for a solid electrolyte-containing layer can be sufficiently improved.

[Cross-Linkable Monomer Unit]

The first polymer preferably includes a cross-linkable monomer unit in addition to the ethylenically unsaturated carboxylic acid ester monomer unit described above. Examples of cross-linkable monomers that can form the cross-linkable monomer unit include monomers that include at least two ethylenically unsaturated bonds in a single molecule thereof. More specifically, the cross-linkable monomer may be a polyfunctional (meth)acrylate compound such as polyethylene glycol diacrylate, polypropylene glycol diacrylate, trimethylolpropane trimethacrylate, pentaerythritol tetraacrylate, or ethylene glycol dimethacrylate; or a polyfunctional aromatic compound such as divinylbenzene. Of these examples, polyfunctional (meth)acrylate compounds are preferable from a viewpoint of further improving leveling performance of a slurry composition for a solid electrolyte-containing layer and output characteristics of an all-solid-state secondary battery, with ethylene glycol dimethacrylate being more preferable. One cross-linkable monomer may be used individually, or two or more cross-linkable monomers may be used in combination in a freely selected ratio.

Note that in the present disclosure, "(meth)acrylate" is used to indicate "acrylate" and/or "methacrylate".

The proportional content of the cross-linkable monomer unit in the first polymer when the amount of all repeating units included in the first polymer is taken to be 100 mass % is preferably 0.01 mass % or more, more preferably 0.05 mass % or more, even more preferably 0.1 mass % or more, and particularly preferably 0.5 mass % or more, and is preferably 5 mass % or less, more preferably 3 mass % or less, and even more preferably 2 mass % or less. When the proportional content of the cross-linkable monomer unit in the first polymer is 0.01 mass % or more, the amount of solvent-insoluble content can be ensured, and leveling performance of a slurry composition for a solid electrolyte-containing layer can be sufficiently improved. In addition, output characteristics of an all-solid-state secondary battery that includes a solid electrolyte-containing layer can be further improved. On the other hand, when the proportional content of the cross-linkable monomer unit in the first polymer is 5 mass % or less, sufficient adhesiveness and flexibility of an obtained solid electrolyte-containing layer can be ensured, and output characteristics of an all-solid-state secondary battery that includes the solid electrolyte-containing layer can be further improved.

[Other Repeating Units]

The first polymer can include repeating units other than the ethylenically unsaturated carboxylic acid ester monomer unit and the cross-linkable monomer unit described above. Any repeating unit derived from a monomer that is copolymerizable with an ethylenically unsaturated carboxylic acid ester monomer and a cross-linkable monomer such as described above can be used as another repeating unit, and examples thereof include an aromatic monovinyl monomer unit and a nitrile group-containing monomer unit. Note that the first polymer may include one type of other repeating unit or may include two or more types of other repeating units.

—Aromatic Monovinyl Monomer Unit—

Examples of aromatic monovinyl monomers that can form the aromatic monovinyl monomer unit include styrene, styrene sulfonic acid and salts thereof (sodium styrenesulfonate, etc.), α-methylstyrene, vinyltoluene, and 4-(tert-butoxy)styrene. Of these aromatic monovinyl monomers, styrene is preferable from a viewpoint of further improving output characteristics of an all-solid-state secondary battery. Note that one aromatic monovinyl monomer may be used individually, or two or more aromatic monovinyl monomers may be used in combination in a freely selected ratio.

In a case in which the first polymer includes an aromatic monovinyl monomer unit, the proportional content of the aromatic monovinyl monomer unit in the first polymer when the amount of all repeating units included in the first polymer is taken to be 100 mass % is preferably 1 mass % or more, more preferably 3 mass % or more, even more preferably 6 mass % or more, and particularly preferably 9 mass % or more, and is preferably 30 mass % or less, more preferably 27 mass % or less, even more preferably 23 mass % or less, and particularly preferably 20 mass % or less. When the proportional content of the aromatic monovinyl monomer unit in the first polymer is 1 mass % or more, the amount of solvent-insoluble content can be ensured, and leveling performance of a slurry composition for a solid electrolyte-containing layer can be sufficiently improved. In addition, output characteristics of an all-solid-state secondary battery that includes a solid electrolyte-containing layer can be further improved. On the other hand, when the proportional content of the aromatic monovinyl monomer unit in the first polymer is 30 mass % or less, sufficient adhesiveness and flexibility of an obtained solid electrolyte-containing layer can be ensured, and output characteristics of an all-solid-state secondary battery that includes the solid electrolyte-containing layer can be further improved.

—Nitrile Group-Containing Monomer Unit—

Examples of nitrile-group containing monomers that can form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile and methacrylonitrile are preferable from a viewpoint of further improving output characteristics of an all-solid-state secondary battery, with acrylonitrile being more preferable. Note that one nitrile group-containing monomer may be used individually, or two or more nitrile group-containing monomers may be used in combination in a freely selected ratio.

In a case in which the first polymer includes a nitrile group-containing monomer unit, the proportional content of the nitrile group-containing monomer unit in the first polymer when the amount of all repeating units included in the first polymer is taken to be 100 mass % is preferably 1 mass % or more, more preferably 3 mass % or more, even more preferably 6 mass % or more, and particularly preferably 9 mass % or more, and is preferably 30 mass % or less, more preferably 27 mass % or less, even more preferably 23 mass % or less, and particularly preferably 20 mass % or less. When the proportional content of the nitrile group-containing monomer unit in the first polymer is 1 mass % or more, adhesiveness of a solid electrolyte-containing layer that is formed using a slurry composition for a solid electrolyte-containing layer can be sufficiently increased, and output characteristics of an all-solid-state secondary battery that includes the solid electrolyte-containing layer can be further improved. On the other hand, when the proportional content of the nitrile group-containing monomer unit in the first polymer is 30 mass % or less, the amount of solvent-insoluble content can be ensured, and leveling performance of a slurry composition for a solid electrolyte-containing layer can be sufficiently improved. In addition, a solid electrolyte-containing layer that is formed using the slurry composition for a solid electrolyte-containing layer does not become excessively rigid, and output characteristics of an all-solid-state secondary battery that includes the solid electrolyte-containing layer can be sufficiently improved.

<<Production Method of First Polymer>>

No specific limitations are placed on the method by which the first polymer is produced. For example, the first polymer may be produced through polymerization of a monomer composition containing the monomers set forth above, carried out in an aqueous solvent. Note that the proportional content of each monomer in the monomer composition can be set in accordance with the desired proportional content of each monomer unit (repeating unit) in the first polymer.

The polymerization method is not specifically limited and may, for example, be any of solution polymerization, suspension polymerization, bulk polymerization, and emulsion polymerization. Also, ionic polymerization, radical polymerization, living radical polymerization, various types of condensation polymerization, addition polymerization, or the like can be adopted as the polymerization reaction. Moreover, a known emulsifier and/or polymerization initiator can be used in the polymerization as necessary.

<Second Polymer>

The second polymer is highly soluble in the solvent contained in the presently disclosed binder composition. Note that the presently disclosed binder composition may contain one polymer as the second polymer or may contain two or more polymers as the second polymer.

<<Amount of Solvent-Insoluble Content>>

The amount of solvent-insoluble content in the second polymer is required to be less than 50 mass % (i.e., the second polymer is highly soluble in the solvent), and is preferably 30 mass % or less, more preferably 10 mass % or less, even more preferably 5 mass % or less, particularly preferably 1 mass % or less, and most preferably 0 mass % (below the limit of measurement). When the amount of solvent-insoluble content in the second polymer is 50 mass % or more, suitable viscosity cannot be imparted to a slurry composition for a solid electrolyte-containing layer, and leveling performance of the slurry composition for a solid electrolyte-containing layer cannot be sufficiently increased. Moreover, output characteristics of an all-solid-state secondary battery that includes a solid electrolyte-containing layer formed using the slurry composition for a solid electrolyte-containing layer deteriorate.

<<Chemical Composition>>

The second polymer is a polymer that includes at least a nitrile group-containing monomer unit and can include repeating units other than the nitrile group-containing monomer unit (i.e., other repeating units).

[Nitrile Group-Containing Monomer Unit]

Examples of nitrile group-containing monomers that can form the nitrile group-containing monomer unit include the same nitrile group-containing monomers as given as examples in the "First polymer" section. Of these nitrile group-containing monomers, acrylonitrile and methacrylonitrile are preferable from a viewpoint of further improving leveling performance of a slurry composition for a solid electrolyte-containing layer while also causing an all-solid-state secondary battery to display even better output characteristics, with acrylonitrile being more preferable. Note that one nitrile group-containing monomer may be used individually, or two or more nitrile group-containing monomers may be used in combination in a freely selected ratio.

The proportional content of the nitrile group-containing monomer unit in the second polymer when the amount of all repeating units included in the second polymer is taken to be 100 mass % is required to be more than 0 mass %, is preferably 5 mass % or more, more preferably 8 mass % or more, even more preferably 12 mass % or more, and particularly preferably 20 mass % or more, and is preferably 30 mass % or less, more preferably 28 mass % or less, even more preferably 26 mass % or less, and particularly preferably 25 mass % or less. When the proportional content of the nitrile group-containing monomer unit in the second polymer is 0 mass % (i.e., when the second polymer does not include a nitrile group-containing monomer unit), it is not possible to produce a slurry composition for a solid electrolyte-containing layer in which a solid electrolyte is well dispersed due to reduction of binding capacity of the second polymer, and leveling performance of the slurry composition for a solid electrolyte-containing layer decreases. Moreover, output characteristics of an all-solid-state secondary battery that includes a solid electrolyte-containing layer formed using the slurry composition for a solid electrolyte-containing layer deteriorate. On the other hand, when the proportional content of the nitrile group-containing monomer unit in the second polymer is 30 mass % or less, solubility of the second polymer in the solvent is ensured, and a slurry composition for a solid electrolyte-containing layer in which a solid electrolyte is sufficiently well dispersed can be produced. Consequently, sufficient leveling performance of the slurry composition for a solid electrolyte-containing layer can be ensured, and output characteristics of an all-solid-state secondary battery that includes a solid electrolyte-containing layer formed using the slurry composition for a solid electrolyte-containing layer can be further improved.

[Other Repeating Units]

Any repeating unit derived from a monomer that is copolymerizable with a nitrile group-containing monomer such as described above can be included as another repeating unit besides the nitrile group-containing monomer unit described above in the second polymer without any specific limitations, and examples thereof include an aliphatic conjugated diene monomer unit, a repeating unit formed of a hydrogenated product of an aliphatic conjugated diene monomer unit (i.e., a hydrogenated aliphatic conjugated diene unit), and an ethylenically unsaturated carboxylic acid ester monomer unit. The second polymer may include one type of other repeating unit or may include two or more types of other repeating units.

Note that in the following description, the term "(hydrogenated) aliphatic conjugated diene monomer unit" may be used a collective term for an "aliphatic conjugated diene monomer unit" and a "hydrogenated aliphatic conjugated diene unit".

Specific examples of the second polymer include the following (A) to (C).

(A) A polymer that includes a nitrile group-containing monomer unit and an aliphatic conjugated diene monomer unit but does not include an ethylenically unsaturated carboxylic acid ester monomer unit, and a hydrogenated product of the polymer (hereinafter, also referred to collectively simply as a second polymer (A))

(B) A polymer that includes a nitrile group-containing monomer unit, an aliphatic conjugated diene monomer unit, and an ethylenically unsaturated carboxylic acid ester monomer unit, and a hydrogenated product of the polymer (hereinafter, also referred to collectively simply as a second polymer (B))

(C) A polymer that includes a nitrile group-containing monomer unit and an ethylenically unsaturated carboxylic acid ester monomer unit but does not include a (hydrogenated) aliphatic conjugated diene monomer unit (hereinafter, also referred to simply as a second polymer (C))

Although the following describes the chemical composition of the second polymer using a case in which the second polymer is the second polymer (A), the second polymer (B), or the second polymer (C) as an example, the present disclosure is not limited thereto. Note that one of the second polymers (A) to (C) may be used individually as the second polymer, or two or more of the second polymers (A) to (C) may be used in combination as the second polymer. Of the polymers (A) to (C), the second polymer (B) is preferable from a viewpoint of increasing dispersibility of an electrode active material, a conductive material, and a solid electrolyte, and thereby even further improving leveling performance of a slurry composition for a solid electrolyte-containing layer (particularly a slurry composition for an electrode mixed material layer), which is presumed to be due to the second polymer (B) having especially good affinity with each of an electrode active material, a conductive material, and a solid electrolyte.

—Second Polymer (A)—

The second polymer (A) at least includes either or both of an aliphatic conjugated diene monomer unit and a hydrogenated aliphatic conjugated diene unit in addition to a nitrile group-containing monomer unit. Note that the second polymer (A) may include any repeating unit that does not correspond to the nitrile group-containing monomer unit or the (hydrogenated) aliphatic conjugated diene monomer unit without any specific limitations so long as the repeating unit is not an ethylenically unsaturated carboxylic acid ester monomer unit.

Examples of aliphatic conjugated diene monomers that can form the (hydrogenated) aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene is preferable from a viewpoint of ensuring sufficient flexibility of a solid electrolyte-containing layer while also further improving output characteristics of an all-solid-state secondary battery. Note that one aliphatic conjugated diene monomer may be used individually, or two or more aliphatic conjugated diene monomers may be used in combination in a freely selected ratio. In other words, the polymer (A) can include at least one selected from the group consisting of a 1,3-butadiene unit, a hydrogenated 1,3-butadiene unit, a 2-methyl-1,3-butadiene (isoprene) unit, a hydrogenated 2-methyl-1,3-butadiene (isoprene) unit, a 2,3-dimethyl-1,3-butadiene unit, and a hydrogenated 2,3-dimethyl-1,3-butadiene unit as a (hydrogenated) aliphatic conjugated diene monomer unit, for example, and preferably includes either or both of a 1,3-butadiene unit and a hydrogenated 1,3-butadiene unit as a (hydrogenated) aliphatic conjugated diene monomer unit.

The proportional content of the (hydrogenated) aliphatic conjugated diene monomer unit (i.e., the total proportional content of an aliphatic conjugated diene monomer unit and a hydrogenated aliphatic conjugated diene unit) in the second polymer (A) when the amount of all repeating units included in the polymer is taken to be 100 mass % is preferably 70 mass % or more, more preferably 72 mass % or more, and even more preferably 74 mass % or more, and is preferably 95 mass % or less, more preferably 92 mass % or less, even more preferably 88 mass % or less, and particularly preferably 80 mass % or less. When the proportional content of the (hydrogenated) aliphatic conjugated diene monomer unit in the second polymer (A) is 70 mass % or more, flexibility of a solid electrolyte-containing layer is ensured, and output characteristics of an all-solid-state secondary battery that includes the solid electrolyte-containing layer can be further improved. On the other hand, when the proportional content of the (hydrogenated) aliphatic conjugated diene monomer unit in the second polymer (A) is 95 mass % or less, strength of the second polymer (A) is ensured, and a solid electrolyte-containing layer can be caused to display good adhesiveness. Consequently, output characteristics of an all-solid-state secondary battery that includes the solid electrolyte-containing layer can be sufficiently improved.

—Second Polymer (B)—

The second polymer (B) includes an ethylenically unsaturated carboxylic acid ester monomer unit and either or both of an aliphatic conjugated diene monomer unit and a hydrogenated aliphatic conjugated diene unit in addition to a nitrile group-containing monomer unit. Note that the second polymer (B) may include any repeating unit other than the nitrile group-containing monomer unit, the (hydrogenated) aliphatic conjugated diene monomer unit, and the ethylenically unsaturated carboxylic acid ester monomer unit.

Examples of aliphatic conjugated diene monomers that can form the (hydrogenated) aliphatic conjugated diene monomer unit include the same aliphatic conjugated diene monomers as given as examples in the "Second polymer (A)" section. Of these aliphatic conjugated diene monomers, 1,3-butadiene is preferable from a viewpoint of ensuring sufficient flexibility of a solid electrolyte-containing layer while also further improving output characteristics of an all-solid-state secondary battery. Note that one aliphatic conjugated diene monomer may be used individually, or two or more aliphatic conjugated diene monomers may be used in combination in a freely selected ratio. In other words, the polymer (B) can include at least one selected from the group consisting of a 1,3-butadiene unit, a hydrogenated 1,3-butadiene unit, a 2-methyl-1,3-butadiene (isoprene) unit, a hydrogenated 2-methyl-1,3-butadiene (isoprene) unit, a 2,3-dimethyl-1,3-butadiene unit, and a hydrogenated 2,3-dimethyl-1,3-butadiene unit as a (hydrogenated) aliphatic conjugated diene monomer unit, for example, and preferably includes either or both of a 1,3-butadiene unit and a hydrogenated 1,3-butadiene unit as a (hydrogenated) aliphatic conjugated diene monomer unit.

The proportional content of the (hydrogenated) aliphatic conjugated diene monomer unit (i.e., the total proportional content of an aliphatic conjugated diene monomer unit and a hydrogenated aliphatic conjugated diene unit) in the second polymer (B) when the amount of all repeating units included in the polymer is taken to be 100 mass % is preferably 30 mass % or more, more preferably 40 mass % or more, and even more preferably 50 mass % or more, and is preferably 90 mass % or less, more preferably 80 mass % or less, even more preferably 70 mass % or less, and particularly preferably 60 mass % or less. When the proportional content of the (hydrogenated) aliphatic conjugated diene monomer unit in the second polymer (B) is 30 mass % or more, flexibility of a solid electrolyte-containing layer is ensured, and output characteristics of an all-solid-state secondary battery that includes the solid electrolyte-containing layer can be further improved. On the other hand, when the proportional content of the (hydrogenated) aliphatic conjugated diene monomer unit in the second polymer (B) is 90 mass % or less, strength of the second polymer (B) is ensured, and a solid electrolyte-containing layer can be caused to display good adhesiveness. Consequently, output characteristics of an all-solid-state secondary battery that includes the solid electrolyte-containing layer can be sufficiently improved.

Examples of ethylenically unsaturated carboxylic acid ester monomers that can form the ethylenically unsaturated carboxylic acid ester monomer unit include the same ethylenically unsaturated carboxylic acid ester monomers as given as examples in the "First polymer" section. Of these ethylenically unsaturated carboxylic acid ester monomers, ethyl acrylate and n-butyl acrylate are preferable from a viewpoint of ensuring sufficient flexibility of a solid electrolyte-containing layer while also further improving output characteristics of an all-solid-state secondary battery, with n-butyl acrylate and dibutyl itaconate being more preferable. Note that one ethylenically unsaturated carboxylic acid ester monomer may be used individually, or two or more ethylenically unsaturated carboxylic acid ester monomers may be used in combination in a freely selected ratio.

The proportional content of the ethylenically unsaturated carboxylic acid ester monomer unit in the second polymer (B) when the amount of all repeating units included in the polymer is taken to be 100 mass % is preferably 5 mass % or more, more preferably 8 mass % or more, even more preferably 12 mass % or more, and particularly preferably 20 mass % or more, and is preferably 50 mass % or less, more preferably 45 mass % or less, and even more preferably 40 mass % or less. When the proportional content of the ethylenically unsaturated carboxylic acid ester monomer unit in the second polymer (B) is 5 mass % or more, flexibility of a solid electrolyte-containing layer is ensured, and output characteristics of an all-solid-state secondary battery that includes the solid electrolyte-containing layer can be further improved. On the other hand, when the proportional content of the ethylenically unsaturated carboxylic acid ester monomer unit in the second polymer (B) is 50 mass % or less, strength of the second polymer (B) is ensured, and a solid electrolyte-containing layer can be caused to display good adhesiveness. Consequently, output characteristics of an all-solid-state secondary battery that includes the solid electrolyte-containing layer can be sufficiently improved.

—Second Polymer (C)—

The second polymer (C) includes an ethylenically unsaturated carboxylic acid ester monomer unit in addition to a nitrile group-containing monomer unit. Note that the second polymer (C) may include any repeating unit that does not correspond to the nitrile group-containing monomer unit or the ethylenically unsaturated carboxylic acid ester monomer unit without any specific limitations so long as the repeating unit is not a (hydrogenated) aliphatic conjugated diene monomer unit.

Examples of ethylenically unsaturated carboxylic acid ester monomers that can form the ethylenically unsaturated carboxylic acid ester monomer unit include the same ethylenically unsaturated carboxylic acid ester monomers as given as examples in the "First polymer" section. One ethylenically unsaturated carboxylic acid ester monomer may be used individually, or two or more ethylenically unsaturated carboxylic acid ester monomers may be used in combination in a freely selected ratio. Ethyl acrylate, n-butyl acrylate, 2-ethylhexyl acrylate, methyl methacrylate, and dibutyl itaconate are preferable as ethylenically unsaturated carboxylic acid ester monomers from a viewpoint of ensuring sufficient flexibility of a solid electrolyte-containing layer while also further improving output characteristics of an all-solid-state secondary battery.

The proportional content of the ethylenically unsaturated carboxylic acid ester monomer unit in the second polymer (C) when the amount of all repeating units included in the polymer is taken to be 100 mass % is preferably 70 mass % or more, more preferably 72 mass % or more, and even more preferably 74 mass % or more, and is preferably 95 mass % or less, more preferably 92 mass % or less, and even more preferably 88 mass % or less. When the proportional content of the ethylenically unsaturated carboxylic acid ester monomer unit in the second polymer (C) is 70 mass % or more, flexibility of a solid electrolyte-containing layer is ensured, and output characteristics of an all-solid-state secondary battery that includes the solid electrolyte-containing layer can be further improved. On the other hand, when the proportional content of the ethylenically unsaturated carboxylic acid ester monomer unit in the second polymer (C) is 95 mass % or less, strength of the second polymer (C) is ensured, and a solid electrolyte-containing layer can be caused to display good adhesiveness. Consequently, output characteristics of an all-solid-state secondary battery that includes the solid electrolyte-containing layer can be sufficiently improved.

<<Production Method of Second Polymer>>

No specific limitations are placed on the method by which the second polymer is produced. For example, the second polymer may be produced by performing polymerization in an aqueous solvent of a monomer composition containing the monomers set forth above, and then optionally performing a hydrogenation reaction. Note that the proportional content of each monomer in the monomer composition can be set in accordance with the desired proportional content of each monomer unit (repeating unit) in the second polymer.

The polymerization method is not specifically limited and may, for example, be any of solution polymerization, suspension polymerization, bulk polymerization, and emulsion polymerization. Also, ionic polymerization, radical polymerization, living radical polymerization, various types of condensation polymerization, addition polymerization, or the like can be adopted as the polymerization reaction. Moreover, a known emulsifier and/or polymerization initiator can be used in the polymerization as necessary. Furthermore, a known hydrogenation reaction can be adopted as the hydrogenation reaction without any specific limitations.

<Content Ratio of First Polymer and Second Polymer>

The proportion constituted by the first polymer among the total of the first polymer and the second polymer is preferably 10 mass % or more, more preferably 20 mass % or more, and even more preferably 30 mass % or more, and is preferably 90 mass % or less, more preferably 80 mass % or less, and even more preferably 70 mass % or less. When the proportion constituted by the amount of the first polymer among the total amount of the first polymer and the second polymer is 10 mass % or more, aggregation of dispersed components such as a solid electrolyte and/or an electrode active material can be inhibited in a slurry composition for a solid electrolyte-containing layer. Consequently, ion conductivity of an obtained solid electrolyte-containing layer can be increased, and output characteristics of an all-solid-state secondary battery can be even further improved. On the other hand, when the proportion constituted by the amount of the first polymer among the total amount of the first polymer and the second polymer is 90 mass % or less, leveling characteristics of a slurry composition for a solid electrolyte-containing layer can be further improved as a result of the slurry composition for a solid electrolyte-containing layer displaying sufficiently good viscosity. Moreover, output characteristics of an all-solid-state secondary battery that includes a solid electrolyte-containing layer formed using the slurry composition for a solid electrolyte-containing layer can be even further improved.

<Solvent>

The solvent contained in the presently disclosed binder composition is not specifically limited and can, for example, be an alicyclic hydrocarbon such as cyclopentane or cyclohexane; an aromatic hydrocarbon such as toluene or xylene; butyl butyrate; diisobutyl ketone; or n-butyl ether. One of these solvents may be used individually, or two or more of these solvents may be used as a mixture. Of these solvents, xylene and butyl butyrate are preferable from a viewpoint of further improving leveling characteristics of a slurry composition for a solid electrolyte-containing layer and also increasing ion conductivity of a solid electrolyte-containing layer while also even further improving output characteristics of an all-solid-state secondary battery.

<Other Components>

Examples of other components that can optionally be contained in the presently disclosed binder composition include dispersants, leveling agents, defoamers, conductive materials, and reinforcing materials. Moreover, a lithium salt may be used as another component in a case in which the all-solid-state secondary battery is an all-solid-state lithium ion secondary battery, for example. These other components are not specifically limited so long as they do not affect battery reactions.

<Production Method of Binder Composition>

No specific limitations are placed on the method by which the presently disclosed binder composition is produced. For example, the binder composition containing the first polymer, the second polymer, and the solvent can be produced by using a known method to mix a dispersion liquid in which the first polymer is dispersed in the solvent and a solution in which the second polymer is dissolved in the solvent, and optionally adding other components.

(Slurry Composition for all-Solid-State Secondary Battery Electrode Mixed Material Layer)

The presently disclosed slurry composition for an electrode mixed material layer contains a solid electrolyte, an electrode active material, and the presently disclosed binder composition set forth above. More specifically, the presently disclosed slurry composition for an electrode mixed material layer is a composition in which a solid electrolyte, an electrode active material, the previously described first polymer, the previously described second polymer, and other optionally contained components (optional components) are dispersed and/or dissolved in a solvent.

When the presently disclosed slurry composition for an electrode mixed material layer is used to produce an electrode mixed material layer, an electrode that includes the electrode mixed material layer can cause an all-solid-state secondary battery to display excellent output characteristics as a result of the presently disclosed slurry composition for an electrode mixed material layer containing the presently disclosed binder composition.

<Solid Electrolyte>

The solid electrolyte can be either of an inorganic solid electrolyte and a polymeric solid electrolyte without any specific limitations so long as it can conduct charge carriers such as lithium ions. Also note that the solid electrolyte may be a mixture of an inorganic solid electrolyte and a polymeric solid electrolyte.

<<Inorganic Solid Electrolyte>>

Crystalline inorganic ion conductors, amorphous inorganic ion conductors, and mixtures thereof can be used as inorganic solid electrolytes without any specific limitations. In a case in which the all-solid-state secondary battery is an all-solid-state lithium ion secondary battery, for example, a crystalline inorganic lithium ion conductor, an amorphous inorganic lithium ion conductor, or a mixture thereof is normally used as an inorganic solid electrolyte.

Although the following describes, as one example, a case in which the slurry composition for an all-solid-state secondary battery electrode mixed material layer is a slurry composition for an all-solid-state lithium ion secondary battery electrode mixed material layer, the presently disclosed slurry composition for an all-solid-state secondary battery electrode mixed material layer is not limited to the following example.

Examples of crystalline inorganic lithium ion conductors include $Li_3N$, LISICON ($Li_{14}Zn(GeO_4)_4$), perovskite-type $Li_{0.5}La_{0.5}TiO_3$, garnet-type $Li_7La_3Zr_2O_{10}$, LIPON ($Li_{3+y}PO_{4-x}N_x$), and Thio-LISICON ($Li_{3.75}Ge_{0.25}P_{0.75}S_4$).

Examples of amorphous inorganic lithium ion conductors include glass Li—Si—S—O and Li—P—S.

Of the examples given above, an amorphous inorganic lithium ion conductor is preferable as an inorganic solid electrolyte for an all-solid-state lithium ion secondary battery from a viewpoint of electrical conductivity, with an amorphous sulfide containing Li and P being more preferable. An amorphous sulfide containing Li and P has high lithium ion conductivity, and thus can reduce internal resistance and improve output characteristics of a battery in which the amorphous sulfide is used as an inorganic solid electrolyte.

The amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S$:$P_2S_5$ is 65:35 to 85:15 from a viewpoint of reducing internal resistance and improving output characteristics of a battery. Moreover, the amorphous sulfide containing Li and P is preferably sulfide glass-ceramic obtained by reacting a mixed raw material of $Li_2S$ and $P_2S_5$ in which the molar ratio of $Li_2S$:$P_2S_5$ is 65:35 to 85:15 by a mechanochemical method. From a viewpoint of maintaining a state of high lithium ion conductivity, the molar ratio of $Li_2S$:$P_2S_5$ in the mixed raw material is preferably 68:32 to 80:20.

The lithium ion conductivity of an inorganic solid electrolyte for an all-solid-state lithium ion secondary battery is not specifically limited but is preferably $1\times10^{-4}$ S/cm or more, and more preferably $1\times10^{-3}$ S/cm or more.

Note that the inorganic solid electrolyte may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilize a glass component in the inorganic solid electrolyte.

In the same manner, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

The number-average particle diameter of the inorganic solid electrolyte is preferably 0.1 μm or more, and more preferably 0.3 μm or more, and is preferably 20 μm or less, more preferably 10 μm or less, even more preferably 7 μm or less, and particularly preferably 5 μm or less. When the number-average particle diameter of the inorganic solid electrolyte is 0.1 μm or more, handling is facilitated, and adhesiveness of an electrode mixed material layer formed using the slurry composition for an electrode mixed material layer can be sufficiently increased. On the other hand, when the number-average particle diameter of the inorganic solid electrolyte is 20 μm or less, sufficient surface area of the inorganic solid electrolyte can be ensured, and output characteristics of an all-solid-state secondary battery can be sufficiently improved.

Note that the "number-average particle diameter" of an inorganic solid electrolyte or an electrode active material referred to in the present disclosure can be determined by measuring the diameters of 100 particles of the inorganic solid electrolyte or the electrode active material in accordance with JIS Z8827-1:2008, through observation under an electron microscope, and then calculating an average value of the measured particle diameters.

<<Polymeric Solid Electrolyte>>

The polymeric solid electrolyte may be a polymeric solid electrolyte obtained through inclusion of an electrolyte salt in a polyethylene oxide derivative, a polymer including a polyethylene oxide derivative, a polypropylene oxide derivative, a polymer including a polypropylene oxide derivative, a phosphoric acid ester polymer, a polycarbonate derivative, a polymer including a polycarbonate derivative, or the like.

In a case in which the all-solid-state secondary battery is an all-solid-state lithium ion secondary battery, for example, examples of electrolyte salts that can be used include, but are not specifically limited to, fluorine-containing lithium salts such as lithium hexafluorophosphate ($LiPF_6$), lithium tetrafluoroborate ($LiBF_4$), and lithium bis(trifluoromethanesulfonyl)imide (LiTFSI).

<<Electrode Active Material>>

The electrode active material is a material that gives and receives electrons in an electrode of an all-solid-state secondary battery. In a case in which the all-solid-state secondary battery is an all-solid-state lithium ion secondary battery, for example, the electrode active material is normally a material that can occlude and release lithium.

Although the following describes, as one example, a case in which the slurry composition for an all-solid-state secondary battery electrode mixed material layer is a slurry composition for an all-solid-state lithium ion secondary battery electrode mixed material layer, the presently disclosed slurry composition for an all-solid-state secondary battery electrode mixed material layer is not limited to the following example.

A positive electrode active material for an all-solid-state lithium ion secondary battery may be a positive electrode active material formed of an inorganic compound or a positive electrode active material formed of an organic compound without any specific limitations. Also note that the positive electrode active material may be a mixture of an inorganic compound and an organic compound.

Examples of positive electrode active materials formed of inorganic compounds include transition metal oxides, complex oxides of lithium and a transition metal (lithium-containing complex metal oxides), and transition metal sulfides. The aforementioned transition metal may be Fe, Co, Ni, Mn, or the like. Specific examples of inorganic compounds that can be used as the positive electrode active material include lithium-containing complex metal oxides such as a lithium-containing complex metal oxide of Co—Ni—Mn($Li(Co\ Mn\ Ni)O_2$), a lithium-containing complex metal oxide of Ni—Co—Al, lithium-containing cobalt oxide ($LiCoO_2$), lithium-containing nickel oxide ($LiNiO_2$), lithium manganate ($LiMnO_2$, $LiMn_2O_4$), olivine-type lithium iron phosphate ($LiFePO_4$), and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

Examples of positive electrode active materials formed of organic compounds include polyaniline, polypyrrole, polyacenes, disulfide compounds, polysulfide compounds, and N-fluoropyridinium salts.

A negative electrode active material for an all-solid-state lithium ion secondary battery may be an allotrope of carbon such as graphite or coke. Note that a negative electrode active material formed of an allotrope of carbon can be used in a mixed or coated form with a metal, a metal salt, an oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

The number-average particle diameter of the electrode active material is preferably 0.1 μm or more, and more preferably 1 μm or more, and is preferably 40 μm or less, and more preferably 30 μm or less. When the number-average particle diameter of the electrode active material is 0.1 μm or more, handling is facilitated, and adhesiveness of an obtained electrode mixed material layer can be sufficiently increased. On the other hand, when the number-average particle diameter of the electrode active material is 40 μm or less, sufficient surface area of the electrode active material can be ensured, and output characteristics of an all-solid-state secondary battery can be sufficiently improved.

The amount of the solid electrolyte contained in the slurry composition for an electrode mixed material layer is an amount such that the proportion constituted by the solid electrolyte among the total amount (100 mass %) of the electrode active material and the solid electrolyte is preferably 10 mass % or more, and more preferably 20 mass % or more, and is preferably 70 mass % or less, and more preferably 60 mass % or less. When the proportion constituted by the solid electrolyte is not less than any of the lower limits set forth above, sufficient ion conductivity can be ensured, the electrode active material can be effectively utilized, and the capacity of an all-solid-state secondary battery can be sufficiently increased. Moreover, when the proportion constituted by the solid electrolyte is not more than any of the upper limits set forth above, a sufficient amount of the electrode active material can be ensured, and the capacity of an all-solid-state secondary battery can be sufficiently increased.

<<First Polymer>>

The slurry composition for an electrode mixed material layer contains the first polymer described above in the "Binder composition for all-solid-state secondary battery" section.

The amount of the first polymer that is contained in the slurry composition for an electrode mixed material layer per 100 parts by mass of all solid content (total of electrode active material, solid electrolyte, first polymer, second polymer, conductive material, etc.) in the slurry composition for an electrode mixed material layer is preferably 0.1 parts by mass or more, more preferably 0.5 parts by mass or more, and even more preferably 0.7 parts by mass or more, and is preferably 5 parts by mass or less, more preferably 3 parts by mass or less, even more preferably 1.5 parts by mass or less, and particularly preferably 1.3 parts by mass or less. When the content of the first polymer in the slurry composition for an electrode mixed material layer is 0.1 parts by mass or more per 100 parts by mass of all solid content, aggregation of dispersed components such as the solid electrolyte can be sufficiently inhibited in the slurry composition for an electrode mixed material layer, and output characteristics of an all-solid-state secondary battery that includes an electrode mixed material layer formed using the slurry composition can be further improved. On the other hand, when the content of the first polymer in the slurry composition for an electrode mixed material layer is 5 parts by mass or less per 100 parts by mass of all solid content, reduction of ion conductivity of an electrode mixed material layer due to the first polymer can be inhibited, and an all-solid-state secondary battery can be caused to display good output characteristics.

<<Second Polymer>>

The slurry composition for an electrode mixed material layer contains the second polymer described above in the "Binder composition for all-solid-state secondary battery" section.

The amount of the second polymer that is contained in the slurry composition for an electrode mixed material layer per 100 parts by mass of all solid content (total of electrode active material, solid electrolyte, first polymer, second polymer, conductive material, etc.) in the slurry composition for an electrode mixed material layer is preferably 0.1 parts by mass or more, more preferably 0.5 parts by mass or more, and even more preferably 0.7 parts by mass or more, and is preferably 5 parts by mass or less, more preferably 3 parts by mass or less, even more preferably 1.5 parts by mass or less, and particularly preferably 1.3 parts by mass or less. When the content of the second polymer in the slurry composition for an electrode mixed material layer is 0.1 parts by mass or more per 100 parts by mass of all solid content, sufficiently good viscosity can be imparted to the slurry composition for an electrode mixed material layer, and leveling performance of the slurry composition for an electrode mixed material layer can be further improved. Moreover, an all-solid-state secondary battery can be caused to display even better output characteristics. On the other hand, when the content of the second polymer in the slurry composition for an electrode mixed material layer is 5 parts by mass or less per 100 parts by mass of all solid content, reduction of ion conductivity of an electrode mixed material layer due to the second polymer can be inhibited, and an all-solid-state secondary battery can be caused to display good output characteristics.

<<Optional Components and Solvent>>

No specific limitations are placed on the optional components and the solvent. Any of the components given as examples of "other components" in the "Binder composition for all-solid-state secondary battery" section can, for example, be used as optional components. Moreover, any of the solvents given as examples in the "Binder composition for all-solid-state secondary battery" section can, for example, be used as the solvent.

<<Production Method of Slurry Composition for Electrode Mixed Material Layer>>

The slurry composition for an electrode mixed material layer is obtained by mixing the components set forth above. The method by which the components of the slurry composition are mixed is not specifically limited and may be a method in which a mixing device of a stirring, shaking, rotary, or other type is used. Moreover, a method using a dispersing and kneading device such as a homogenizer, a ball mill, a bead mill, a sand mill, a roll mill, or a planetary kneader may be adopted, and a method using a planetary kneader (planetary centrifugal mixer, etc.), a ball mill, or a bead mill is preferable from a viewpoint that aggregation of the electrode active material and/or the solid electrolyte can be inhibited.

(Slurry Composition for all-Solid-State Secondary Battery Solid Electrolyte Layer)

The presently disclosed slurry composition for a solid electrolyte layer contains a solid electrolyte and the presently disclosed binder composition set forth above. More specifically, the presently disclosed slurry composition for a solid electrolyte layer is a composition in which a solid electrolyte, the previously described first polymer, the previously described second polymer, and other optionally contained components (optional components) are dispersed and/or dissolved in a solvent.

When a solid electrolyte layer is produced using the presently disclosed slurry composition for a solid electrolyte layer, an all-solid-state secondary battery can be caused to display excellent output characteristics as a result of the presently disclosed slurry composition for a solid electrolyte layer containing the presently disclosed binder composition.

<Solid Electrolyte>

Any of the same solid electrolytes as given as examples in the "Slurry composition for all-solid-state secondary battery electrode mixed material layer" section can be used as the solid electrolyte. Moreover, preferred examples, preferred properties, and so forth of the solid electrolyte contained in the slurry composition for a solid electrolyte layer are the same as the preferred examples, preferred properties, and so forth of the solid electrolyte contained in the slurry composition for an electrode mixed material layer.

<<First Polymer>>

The slurry composition for a solid electrolyte layer contains the first polymer described above in the "Binder composition for all-solid-state secondary battery" section.

The amount of the first polymer that is contained in the slurry composition for a solid electrolyte layer per 100 parts by mass of the solid electrolyte is preferably 0.1 parts by mass or more, more preferably 0.5 parts by mass or more, and even more preferably 0.7 parts by mass or more, and is preferably 5 parts by mass or less, more preferably 3 parts by mass or less, even more preferably 1.5 parts by mass or less, and particularly preferably 1.3 parts by mass or less. When the content of the first polymer in the slurry composition for a solid electrolyte layer is 0.1 parts by mass or more per 100 parts by mass of the solid electrolyte, aggregation of the solid electrolyte can be sufficiently inhibited in the slurry composition for a solid electrolyte layer, and output characteristics of an all-solid-state secondary battery that includes a solid electrolyte layer formed using the slurry composition can be further improved. On the other hand, when the content of the first polymer in the slurry composition for a solid electrolyte layer is 5 parts by mass or less per 100 parts by mass of the solid electrolyte, reduction of ion conductivity of a solid electrolyte layer due to the first polymer can be inhibited, and an all-solid-state secondary battery can be caused to display good output characteristics.

<<Second Polymer>>

The slurry composition for a solid electrolyte layer contains the second polymer described above in the "Binder composition for all-solid-state secondary battery" section.

The amount of the second polymer that is contained in the slurry composition for a solid electrolyte layer per 100 parts by mass of the solid electrolyte is preferably 0.1 parts by mass or more, more preferably 0.5 parts by mass or more, and even more preferably 0.7 parts by mass or more, and is preferably 5 parts by mass or less, more preferably 3 parts by mass or less, even more preferably 1.5 parts by mass or less, and particularly preferably 1.3 parts by mass or less. When the content of the second polymer in the slurry composition for a solid electrolyte layer is 0.1 parts by mass or more per 100 parts by mass of the solid electrolyte, sufficiently good viscosity can be imparted to the slurry composition for a solid electrolyte layer, and leveling performance of the slurry composition for a solid electrolyte layer can be further improved. Moreover, an all-solid-state secondary battery can be caused to display even better output characteristics. On the other hand, when the content of the second polymer in the slurry composition for a solid electrolyte layer is 5 parts by mass or less per 100 parts by mass of the solid electrolyte, reduction of ion conductivity of a solid electrolyte layer due to the second polymer can be inhibited, and an all-solid-state secondary battery can be caused to display good output characteristics.

<<Optional Components and Solvent>>

No specific limitations are placed on the optional components and the solvent. Dispersants, leveling agents, defoamers, and the like given as examples of "other components" in the "Binder composition for all-solid-state secondary battery" section can, for example, be used as optional components. Moreover, any of the solvents given as examples in the "Binder composition for all-solid-state secondary battery" section can, for example, be used as the solvent.

(Electrode for all-Solid-State Secondary Battery)

The presently disclosed slurry composition for an electrode mixed material layer set forth above can be used to produce the presently disclosed electrode for an all-solid-state secondary battery. For example, the presently disclosed slurry composition for an electrode mixed material layer can be used to form an electrode mixed material layer on a current collector so as to obtain an electrode that includes a current collector and an electrode mixed material layer on the current collector. The presently disclosed electrode including an electrode mixed material layer formed from the presently disclosed slurry composition for an electrode mixed material layer can cause an all-solid-state secondary battery to display excellent output characteristics.

<Current Collector>

The current collector is not specifically limited so long as it is a material having electrical conductivity and electrochemical durability, but is preferably a metal material such as iron, copper, aluminum, nickel, stainless steel, titanium, tantalum, gold, or platinum from a viewpoint of having heat resistance. Of these materials, aluminum is particularly preferable for a positive electrode, whereas copper is particularly preferable for a negative electrode. Although no specific limitations are placed on the shape of the current collector, the current collector preferably has a sheet shape of approximately 0.001 mm to 0.5 mm in thickness. The current collector is preferably subjected to surface roughening before use in order to increase adhesion strength with the electrode mixed material layer. The method of surface roughening may, for example, be a mechanical polishing method, an electrolytic polishing method, or a chemical polishing method. The mechanical polishing is performed, for example, using a coated abrasive to which abrasive grains are bonded, a whetstone, an emery wheel, or a wire brush including steel wire or the like. An intermediate layer may be formed on the surface of the current collector in order to increase electrical conductivity and/or adhesion strength of the current collector with the electrode mixed material layer.

<Electrode Mixed Material Layer>

The electrode mixed material layer is formed using the presently disclosed slurry composition for an electrode mixed material layer as previously described. Specifically, the electrode mixed material layer is formed of a dried product of the presently disclosed slurry composition for an electrode mixed material layer and contains at least a solid electrolyte, an electrode active material, the first polymer, and the second polymer. It should be noted that components contained in the electrode mixed material layer are components that were contained in the slurry composition for an electrode mixed material layer, and thus the preferred ratio of these components in the electrode mixed material layer is the same as the preferred ratio of the components in the slurry composition for an electrode mixed material layer.

<Production Method of Electrode for all-Solid-State Secondary Battery>

The electrode is produced, for example, through a step of applying the presently disclosed slurry composition for an electrode mixed material layer onto the current collector (application step) and a step of drying the slurry composition for an electrode mixed material layer that has been applied onto the current collector to form the electrode mixed material layer (drying step).

<<Application Step>>

The slurry composition for an electrode mixed material layer can be applied onto the current collector by any commonly known method without any specific limitations. Specific examples of application methods that can be used include doctor blading, dip coating, reverse roll coating, direct roll coating, gravure coating, extrusion coating, and brush coating.

The amount of the slurry composition for an electrode mixed material layer that is applied can be set as appropriate depending on the desired electrode mixed material layer thickness, for example, without any specific limitations.

<<Drying Step>>

The slurry composition for an electrode mixed material layer on the current collector can be dried by any commonly known method without any specific limitations. Specific examples of drying methods that can be used include drying by warm, hot, or low-humidity air, drying in a vacuum, and drying through irradiation with (far) infrared light, electron beams, or the like. The drying conditions are preferably adjusted such that the solvent is volatilized as quickly as possible under conditions with which cracks do not form in the electrode mixed material layer due to stress concentration and with which peeling of the electrode mixed material layer from the current collector does not occur.

Specifically, the drying temperature is preferably not lower than 50° C. and not higher than 250° C., and is preferably not lower than 80° C. and not higher than 200° C. When the drying temperature is within any of the ranges set forth above, thermal decomposition of the first polymer and/or the second polymer can be inhibited, and the electrode mixed material layer can be well formed. The drying time is not specifically limited but is normally not less than 10 minutes and not more than 60 minutes.

Also note that pressing of the electrode may be performed after drying in order to stabilize the electrode. The method of pressing may be mold pressing, calender pressing, or the like, but is not limited thereto.

The mass per unit area of the electrode mixed material layer in the electrode that is obtained as set forth above is not specifically limited but is preferably not less than 1.0 $mg/cm^2$ and not more than 20.0 $mg/cm^2$, and more preferably not less than 5.0 $mg/cm^2$ and not more than 15.0 $mg/cm^2$.

(Solid Electrolyte Layer for all-Solid-State Secondary Battery)

The presently disclosed slurry composition for a solid electrolyte layer set forth above can be used to produce the presently disclosed solid electrolyte layer. The presently disclosed solid electrolyte layer produced using the presently disclosed slurry composition for a solid electrolyte layer can cause an all-solid-state secondary battery to display excellent output characteristics.

The presently disclosed solid electrolyte layer is formed using the presently disclosed slurry composition for a solid electrolyte layer as previously described. Specifically, the solid electrolyte layer is formed of a dried product of the presently disclosed slurry composition for a solid electrolyte layer and contains at least a solid electrolyte, the first polymer, and the second polymer. It should be noted that components contained in the solid electrolyte layer are components that were contained in the slurry composition for a solid electrolyte layer, and thus the preferred ratio of these components in the solid electrolyte layer is the same as the preferred ratio of the components in the slurry composition for a solid electrolyte layer.

<Production Method of Solid Electrolyte Layer for all-Solid-State Secondary Battery>

Examples of methods by which the solid electrolyte layer may be formed include:

(1) a method in which the presently disclosed slurry composition for a solid electrolyte layer is applied onto an electrode (normally the surface of an electrode mixed material layer; same applies below) and is then dried to form a solid electrolyte layer on the electrode;

(2) a method in which the presently disclosed slurry composition for a solid electrolyte layer is applied onto a substrate and is dried, and then the resultant solid electrolyte layer is transferred onto an electrode to form a solid electrolyte layer on the electrode; and (3) a method in which the presently disclosed slurry composition for a solid electrolyte layer is applied onto a substrate and is dried to obtain a dried product of the slurry composition for a solid electrolyte layer that is subsequently pulverized to obtain a powder, and then the powder is molded into a layer form to form a self-supporting solid electrolyte layer.

Known methods can be adopted as the methods by which application, drying, transferring, pulverizing, molding, and so forth are performed in the above-described methods (1) to (3).

The thickness of the solid electrolyte layer obtained as set forth above is not specifically limited but is preferably not less than 10 μm and not more than 500 μm, more preferably not less than 20 μm and not more than 300 μm, and even more preferably not less than 30 μm and not more than 200 μm. When the thickness of the solid electrolyte layer is within any of the ranges set forth above, internal resistance of an all-solid-state secondary battery can be reduced, and the all-solid-state secondary battery can be caused to display even better output characteristics. Also note that short-circuiting of a positive electrode and a negative electrode inside an all-solid-state secondary battery can be sufficiently inhibited when the solid electrolyte layer has a thickness of 10 μm or more.

(All-Solid-State Secondary Battery)

The presently disclosed all-solid-state secondary battery includes either or both of the presently disclosed electrode set forth above and the presently disclosed solid electrolyte layer set forth above. Specifically, the presently disclosed all-solid-state secondary battery includes a positive electrode including a positive electrode mixed material layer, a negative electrode including a negative electrode mixed material layer, and a solid electrolyte layer, and at least one selected from the group consisting of the positive electrode mixed material layer, the negative electrode mixed material layer, and the solid electrolyte layer is formed using a slurry composition for a solid electrolyte-containing layer (slurry composition for an electrode mixed material layer or slurry composition for a solid electrolyte layer) that contains the presently disclosed binder composition set forth above.

The presently disclosed all-solid-state secondary battery has excellent battery characteristics such as output characteristics as a result of at least one of the positive electrode mixed material layer, the negative electrode mixed material layer, and/or the solid electrolyte layer containing the first polymer and the second polymer originating from the presently disclosed binder composition.

Note that any electrode that does not include an electrode mixed material layer formed using the presently disclosed slurry composition for an electrode mixed material layer can be used in the presently disclosed all-solid-state secondary battery without any specific limitations as an electrode (positive electrode or negative electrode) other than the presently disclosed electrode including an electrode mixed material layer formed using the presently disclosed slurry composition for an electrode mixed material layer.

Moreover, any solid electrolyte layer that is not formed using the presently disclosed slurry composition for a solid electrolyte layer can be used in the presently disclosed all-solid-state secondary battery without any specific limitations as a solid electrolyte layer other than the presently disclosed solid electrolyte layer formed using the presently disclosed slurry composition for a solid electrolyte layer.

Furthermore, the presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer and optionally performing pressing thereof to obtain a laminate, subsequently placing the laminate in a battery container in that form or after rolling, folding, or the like, depending on the battery shape, and then sealing the battery container. Note that pressure increase inside the battery and the occurrence of overcharging or overdischarging can be prevented by placing an expanded metal, an overcurrent preventing device such as a fuse or a PTC device, a lead plate, or the like in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure or evaluate the chemical composition, amount of solvent-insoluble content, and volume-average particle diameter in solvent of a polymer, the leveling performance of a slurry composition for a negative electrode mixed material layer and a slurry composition for a solid electrolyte layer, the lithium ion conductivity of a solid electrolyte layer, and the output characteristics of an all-solid-state secondary battery.

<Chemical Composition>

After coagulating 100 g of a water dispersion of a polymer in 1 L of methanol, vacuum drying was performed at a temperature of 60° C. for 12 hours to obtain a dry polymer. The obtained dry polymer was analyzed by $^{1}$H-NMR, and the content ratio (mass ratio) of repeating units included in the polymer was calculated based on peak areas in the obtained spectrum.

<Amount of Solvent-Insoluble Content>

A water dispersion of a polymer was dried in an environment of 50% humidity and 23° C. to 25° C. to produce a film having a thickness of 3±0.3 mm. Next, the produced film was cut into 5 mm squares to prepare film pieces. Approximately 1 g of these film pieces were precisely weighed and the weight of the precisely weighed film pieces was taken to be W0. The precisely weighed film pieces were immersed in 100 g of a solvent (temperature 25° C.) of a binder composition for 24 hours. After 24 hours of immersion, the film pieces were pulled out of the solvent, were vacuum dried at 105° C. for 3 hours, and then the weight (insoluble content weight) W1 thereof was precisely weighed. The amount of solvent-insoluble content (%) was calculated by the following formula.

$$\text{Amount of solvent-insoluble content (\%)}=W1/W0\times 100$$

<Volume-Average Particle Diameter in Solvent>

A solvent (xylene or butyl butyrate) dispersion of a polymer in which the solid content concentration of the polymer had been adjusted to 1.0 mass % was used as a measurement sample. A particle size distribution (by volume) was measured for the measurement sample using a laser diffraction particle diameter distribution analyzer (produced by Shimadzu Corporation; product name: SALD-3100), and the particle diameter at which cumulative volume calculated from a small diameter end of the particle size distribution reached 50% was taken to be the volume-average particle diameter of the polymer in the solvent.

<Leveling Performance>

A flat-bottomed, cylindrical, transparent vessel made from glass that had an internal diameter of 30 mm and a height of 120 mm and that was marked with reference lines at heights of 55 mm and 85 mm from the bottom surface (respectively referred to as an A line and a B line) was filled with a slurry composition (slurry composition for a solid electrolyte layer or slurry composition for a negative electrode mixed material layer) up to the A line and was then sealed by a rubber stopper. The vessel was left upright in a 25° C. environment for 10 minutes after being sealed. After being left, the vessel was tipped over into a horizontal state, the time T taken for the leading edge of the liquid surface of the slurry composition to pass the B line after the vessel had been tipped over into a horizontal state was measured, and the time T was evaluated by the following standard. A shorter time T indicates that the slurry composition has better leveling performance.

AA: Time T of less than 1 s

A: Time T of not less than 1 s and less than 3 s

B: Time T of not less than 3 s and less than 5 s

C: Time T of not less than 5 s and less than 10 s

D: Time T of 10 s or more

<Lithium Ion Conductivity>

A slurry composition for a solid electrolyte layer was dried using a 130° C. hot plate, and the resultant powder was shaped into a 011.28 mm×0.5 mm cylindrical shape to obtain a measurement sample. The lithium ion conductivity (normal temperature) of the measurement sample was measured by the alternating current impedance method. This measurement was performed using a frequency response analyzer (produced by Solartron Analytical; product name: Solartron® 1260 (Solartron is a registered trademark in Japan, other countries, or both)) under measurement conditions of an applied voltage of 10 mV and a measurement frequency range of 0.01 MHz to 1 MHz. The lithium ion conductivity of a solid electrolyte by itself was taken to be 100%, and the lithium ion conductivity maintenance rate (conductivity maintenance rate) when a polymer such as a first polymer and/or a second polymer was mixed therewith was evaluated by the following standard. A larger value for the conductivity maintenance rate indicates that a solid electrolyte layer obtained using the slurry composition for a solid electrolyte layer has better lithium ion conductivity.

A: Conductivity maintenance rate of 30% or more

B: Conductivity maintenance rate of not less than 20% and less than 30%

C: Conductivity maintenance rate of not less than 10% and less than 20%

D: Conductivity maintenance rate of less than 10%

<Output Characteristics>

Ten all-solid-state secondary battery cells were charged to 4.3 V by a 0.1C constant-current method, were subsequently discharged to 3.0 Vat 0.1C, and the 0.1C discharge capacity was determined. Next, charging was performed to 4.3 V at 0.1C, discharging was subsequently performed to 3.0 V at 10C, and the 10C discharge capacity was determined. An average value of the 0.1C discharge capacity for 10 cells was taken to be a discharge capacity a, an average value of the 10C discharge capacity for 10 cells was taken to be a discharge capacity b, and a ratio (capacity ratio) of the discharge capacity b relative to the discharge capacity a (=discharge capacity b/discharge capacity a×100(%)) was determined and was evaluated by the following standard. A larger value for the capacity ratio indicates better output characteristics.

A: Capacity ratio of 50% or more

B: Capacity ratio of not less than 40% and less than 50%

C: Capacity ratio of not less than 30% and less than 40%

D: Capacity ratio of less than 30%

Example 1

<Production of Xylene Dispersion of First Polymer>

A 1 L septum-equipped flask that included a stirrer was charged with 100 parts of deionized water, the gas phase was purged with nitrogen gas, and heating was performed to 70° C. Thereafter, a solution of 0.5 parts of ammonium persulfate (APS) as a polymerization initiator dissolved in 20.0 parts of deionized water was added into the flask.

Meanwhile, a monomer composition was obtained in a separate vessel by mixing 40 parts of deionized water, 1.0 parts of sodium dodecylbenzenesulfonate as an emulsifier, 15 parts of styrene as an aromatic monovinyl monomer, 85 parts of 2-ethylhexyl acrylate as an ethylenically unsaturated carboxylic acid ester monomer, and 1 part of ethylene glycol dimethacrylate as a cross-linkable monomer.

The obtained monomer composition was added continuously into the 1 L septum-equipped flask over 2 hours to carry out polymerization. A reaction temperature of 70° C. was maintained during addition of the monomer composition. After addition of the monomer composition, 3 hours of stirring was performed at 80° C., and then the polymerization was ended. The resultant water dispersion of a first polymer was used to measure the chemical composition of the first polymer. The results are shown in Table 1.

In addition, an appropriate amount of xylene was added to the obtained water dispersion of the first polymer to obtain a mixture. Thereafter, water and excess xylene were removed from the mixture through distillation under reduced pressure at 90° C. to obtain a xylene dispersion (solid content concentration: 8%) of the first polymer. Note that the amount of solvent (xylene) insoluble content in the obtained first polymer was measured, and the first polymer was confirmed to be poorly soluble in the solvent (xylene). Moreover, the volume-average particle diameter of the obtained first polymer in the solvent (xylene) was measured. Results of these measurements are shown in Table 1.

<Production of Xylene Solution of Second Polymer>

A reactor having a capacity of 10 L was charged with 100 parts of deionized water, 25 parts of acrylonitrile as a nitrile group-containing monomer, and 75 parts of 1,3-butadiene as an aliphatic conjugated diene monomer, and then 2 parts of potassium oleate as an emulsifier, 0.1 parts of potassium phosphate as a stabilizer, and 0.5 parts of 2,2',4,6,6'-pentamethylheptane-4-thiol (TIBM) as a molecular weight modifier were further added. Emulsion polymerization was performed at 30° C. in the presence of 0.35 parts of potassium persulfate as a polymerization initiator to copolymerize acrylonitrile and 1,3-butadiene.

At the point at which the polymerization conversion rate reached 90%, 0.2 parts of hydroxylamine sulfate was added to end the polymerization. Thereafter, heating was performed, water vapor was distilled and residual monomer was collected under reduced pressure at approximately 70° C., and then 2 parts of an alkylated phenol as an antioxidant was added to yield a water dispersion of a polymer.

Next, 400 mL (total solid content: 48 g) of the obtained water dispersion of the polymer was loaded into a 1 L autoclave equipped with a stirrer, and nitrogen gas was passed for 10 minutes to remove dissolved oxygen in the water dispersion. Thereafter, 50 mg of palladium acetate as a hydrogenation reaction catalyst was dissolved in 180 mL of water to which nitric acid had been added in an amount of 4 molar equivalents relative to the Pd, and was added into the autoclave. The system was purged twice with hydrogen gas and then the contents of the autoclave were heated to 50° C. in a state of pressurization to 3 MPa with hydrogen gas, and a hydrogenation reaction was carried out for 6 hours.

Thereafter, the contents were restored to normal temperature, the system was converted to a nitrogen atmosphere, and then the contents were concentrated to a solid content concentration of 40% using an evaporator to yield a water dispersion of a second polymer (hydrogenated nitrile rubber). The obtained water dispersion of the second polymer was used to measure the chemical composition of the second polymer. The results are shown in Table 1.

In addition, an appropriate amount of xylene was added to the obtained water dispersion of the second polymer to obtain a mixture. Thereafter, water and excess xylene were removed from the mixture through distillation under reduced pressure at 90° C. to obtain a xylene solution (solid content concentration: 8%) of the second polymer. Note that the amount of solvent (xylene) insoluble content in the obtained second polymer was measured, and the second polymer was confirmed to be highly soluble in the solvent (xylene). The results are shown in Table 1.

<Production of Binder Composition Containing First Polymer and Second Polymer>

A binder composition (for a negative electrode mixed material layer and for a solid electrolyte layer) was produced by mixing the xylene dispersion of the first polymer and the xylene solution of the second polymer that were obtained as described above such that the quantitative ratio (in terms of solid content) thereof was first polymer:second polymer=50:50.

<Production of Slurry Composition for Negative Electrode Mixed Material Layer>

A mixture was obtained by mixing 65 parts of graphite (number-average particle diameter: 20 μm) as a negative electrode active material, 30 parts of sulfide glass formed of $Li_2S$ and $P_2S_5$ ($Li_2S/P_2S_{5=70}$ mol %/30 mol %; number-average particle diameter: 0.4 μm) as a solid electrolyte, 3 parts of acetylene black as a conductive agent, and 2 parts (in terms of solid content) of the binder composition described above, and then xylene was added to the mixture to produce a composition having a solid content concentration of 60%. This composition was mixed by a planetary kneader to obtain a slurry composition for a negative electrode mixed material layer. The obtained slurry composition for a negative electrode mixed material layer was used to evaluate leveling performance. The result is shown in Table 1.

<Production of Slurry Composition for Positive Electrode Mixed Material Layer>

A xylene solution of a polymer was produced in the same way as in "Production of xylene solution of second polymer" described above with the exception that 20 parts of acrylonitrile as a nitrile group-containing monomer, 60 parts of 1,3-butadiene as an aliphatic conjugated diene monomer, and 20 parts of n-butyl acrylate as an ethylenically unsaturated carboxylic acid ester monomer were used as monomers. The obtained xylene solution of the polymer was used as a binder composition (for a positive electrode mixed material layer).

Next, a mixture was obtained by mixing 65 parts of an active material NMC532 based on a lithium complex oxide of Co—Ni—Mn($LiNi_{5/10}Co_{2/10}Mn_{3/10}O_2$; number-average particle diameter: 10.0 μm) as a positive electrode active material, 30 parts of sulfide glass formed of $Li_2S$ and $P_2S_5$ ($Li_2S/P_2S_5$=70 mol %/30 mol %; number-average particle diameter: 0.4 μm) as a solid electrolyte, 3 parts of acetylene black as a conductive agent, and 2 parts (in terms of solid content) of the binder composition (for a positive electrode mixed material layer) obtained as described above, and then xylene was added to the mixture to produce a composition having a solid content concentration of 75%. This composition was mixed for 60 minutes using a planetary kneader, was further adjusted to a solid content concentration of 70% with xylene, and was further mixed using the planetary kneader for 10 minutes to obtain a slurry composition for a positive electrode mixed material layer.

<Production of Slurry Composition for Solid Electrolyte Layer>

A mixture was obtained by mixing 98 parts of sulfide glass formed of $Li_2S$ and $P_2S_5$ ($Li_2S/P_2S_{5=70}$ mol %/30 mol %; number-average particle diameter: 0.4 μm) as a solid electrolyte and 2 parts (in terms of solid content) of the binder composition described above, and then xylene was added to the mixture to produce a composition having a solid content concentration of 60%. This composition was mixed by a planetary kneader to obtain a slurry composition for a solid electrolyte layer. The obtained slurry composition for a solid electrolyte layer was used to evaluate leveling performance and ion conductivity. The results are shown in Table 1.

<Production of Solid Electrolyte Layer>

The slurry composition for a solid electrolyte layer described above was dried on a release sheet serving as a substrate, and the resultant dried product was peeled from the release sheet and was ground in a mortar to obtain a powder. Next, 0.05 mg of the obtained powder was loaded into a mold of 10 mm in diameter and was molded with a pressure of 200 MPa to obtain a pellet (solid electrolyte layer) of 500 μm in thickness.

<Production of Negative Electrode>

The slurry composition for a negative electrode mixed material layer was applied onto the surface of copper foil serving as a current collector and was dried at 120° C. for 20 minutes to obtain a negative electrode including a negative electrode mixed material layer (mass per unit area: 10.0 $mg/cm^2$) at one side of the copper foil serving as a current collector.

<Production of Positive Electrode>

The slurry composition for a positive electrode mixed material layer was applied onto the surface of aluminum foil serving as a current collector and was dried at 120° C. for 30 minutes to obtain a positive electrode including a positive electrode mixed material layer (mass per unit area: 18.0 $mg/cm^2$) at one side of the aluminum foil serving as a current collector.

<Production of all-Solid-State Secondary Battery>

The negative electrode and the positive electrode obtained as described above were each punched out with a diameter of 10 mm. The solid electrolyte layer obtained as described above was sandwiched between the punched positive electrode and negative electrode (sandwiched with the electrode mixed material layers of the electrodes in contact with the solid electrolyte layer) and was then pressed with a pressure of 200 MPa to obtain a laminate for an all-solid-state secondary battery. The obtained laminate was arranged inside an evaluation cell (confining pressure: 40 MPa) to obtain an all-solid-state secondary battery. The output characteristics of the obtained all-solid-state secondary battery were evaluated. The result is shown in Table 1.

Example 2

A xylene dispersion of a first polymer, a xylene solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that 15 parts of acrylonitrile as a nitrile group-containing monomer, 40 parts of n-butyl acrylate and 45 parts of ethyl acrylate as ethylenically unsaturated carboxylic acid ester monomers, and 1 part of ethylene glycol dimethacrylate as a cross-linkable monomer were used as monomers in production of the xylene dispersion of the first polymer. The results are shown in Table 1.

Examples 3 and 4

A xylene dispersion of a first polymer, a xylene solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that the mixing ratio of the first polymer and the second polymer (first polymer: second polymer) was changed to 75:25 (Example 3) or 25:75 (Example 4) in production of the binder composition. The results are shown in Table 1.

Examples 5 and 6

A xylene dispersion of a first polymer, a xylene solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that the amount of the binder composition in terms of solid content was changed to 4 parts (Example 5) or 1 part (Example 6) in production of the slurry composition for a negative electrode mixed material layer and the slurry composition for a solid electrolyte layer. The results are shown in Table 1.

Examples 7 to 10

A xylene dispersion of a first polymer, a xylene solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that the amounts of acrylonitrile and 1,3-butadiene used to produce the second polymer were changed to 10 parts and 90 parts (Example 7), 28 parts and 72 parts (Example 8), 3 parts and 97 parts (Example 9), or 35 parts and 65 parts (Example 10) in production of the xylene dispersion of the second polymer. The results are shown in Tables 1 and 2.

Example 11

A xylene dispersion of a first polymer, a xylene solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that 20 parts of acrylonitrile as a nitrile group-containing monomer, 60 parts of 1,3-butadiene as an aliphatic conjugated diene monomer, and 20 parts of n-butyl acrylate as an ethylenically unsaturated carboxylic acid ester monomer were used as monomers in production of the xylene solution of the second polymer. The results are shown in Table 2.

Example 12

A xylene dispersion of a first polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that a xylene solution of a second polymer produced as described below was used. The results are shown in Table 2.

<Production of Xylene Solution of Second Polymer>

A reactor having a capacity of 10 L was charged with 100 parts of deionized water, 20 parts of acrylonitrile as a nitrile group-containing monomer, and 80 parts of 1,3-butadiene as an aliphatic conjugated diene monomer, and then 2 parts of potassium oleate as an emulsifier, 0.1 parts of potassium phosphate as a stabilizer, and 0.5 parts of 2,2',4,6,6'-pentamethylheptane-4-thiol (TIBM) as a molecular weight modifier were further added. Emulsion polymerization was performed at 30° C. in the presence of 0.35 parts of potassium persulfate as a polymerization initiator to copolymerize acrylonitrile and 1,3-butadiene.

At the point at which the polymerization conversion rate reached 90%, 0.2 parts of hydroxylamine sulfate was added to end the polymerization. Thereafter, heating was performed, water vapor was distilled and residual monomer was collected under reduced pressure at approximately 70° C., and then 2 parts of an alkylated phenol as an antioxidant was added to yield a water dispersion of a second polymer (nitrile rubber).

An appropriate amount of xylene was added to the obtained water dispersion of the second polymer to obtain a mixture. Thereafter, water and excess xylene were removed from the mixture through distillation under reduced pressure at 90° C. to obtain a xylene solution (solid content concentration: 8%) of the second polymer. Note that the amount of solvent (xylene) insoluble content in the obtained second polymer was measured, and the second polymer was confirmed to be highly soluble in the solvent (xylene). The results are shown in Table 2.

Example 13

A xylene dispersion of a first polymer, a xylene solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 12 with the exception that 20 parts of acrylonitrile as a nitrile group-containing monomer, 60 parts of 1,3-butadiene as an aliphatic conjugated diene monomer, and 20 parts of n-butyl acrylate as an ethylenically unsaturated carboxylic acid ester monomer were used as monomers in production of the xylene solution of the second polymer. The results are shown in Table 2.

Example 14

A xylene dispersion of a first polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that a xylene solution of a second polymer produced as described below was used. The results are shown in Table 2.

<Production of Xylene Solution of Second Polymer>

A 1 L septum-equipped flask that included a stirrer was charged with 100 parts of deionized water, the gas phase was purged with nitrogen gas, and heating was performed to 70° C. Thereafter, a solution of 0.5 parts of ammonium persulfate (APS) as a polymerization initiator dissolved in 20.0 parts of deionized water was added into the flask.

Meanwhile, a monomer composition was obtained in a separate vessel by mixing 40 parts of deionized water, 1.0 parts of sodium dodecylbenzenesulfonate as an emulsifier, 20 parts of acrylonitrile as a nitrile group-containing monomer, and 45 parts of n-butyl acrylate and 35 parts of ethyl acrylate as ethylenically unsaturated carboxylic acid ester monomers.

The obtained monomer composition was added continuously into the 1 L septum-equipped flask over 2 hours to carry out polymerization. Note that a reaction temperature of 70° C. was maintained during addition of the monomer composition. After addition of the monomer composition, 3 hours of stirring was performed at 80° C., and then the polymerization was ended.

An appropriate amount of xylene was added to the resultant water dispersion of a second polymer to obtain a mixture. Thereafter, water and excess xylene were removed from the mixture through distillation under reduced pressure at 90° C. to obtain a xylene solution (solid content concentration: 8%) of the second polymer. Note that the amount of solvent (xylene) insoluble content in the obtained second polymer was measured, and the second polymer was confirmed to be highly soluble in the solvent (xylene). The results are shown in Table 2.

Example 15

A xylene dispersion of a first polymer, a xylene solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 14 with the exception that 20 parts of acrylonitrile as a nitrile group-containing monomer, and 40 parts of 2-ethylhexyl acrylate and 40 parts of methyl methacrylate as ethylenically unsaturated carboxylic acid ester monomers were used as monomers in production of the xylene solution of the second polymer. The results are shown in Table 2.

Example 16

Operations, measurements, and evaluations were performed in the same way as in Example 1 with the exception that butyl butyrate was used instead of xylene as a solvent. In other words, a butyl butyrate dispersion of a first polymer, a butyl butyrate solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed through the same operations as in Example 1 with the exception that butyl butyrate was used instead of xylene. The results are shown in Table 3.

Example 17

Operations, measurements, and evaluations were performed in the same way as in Example 11 with the exception that butyl butyrate was used instead of xylene as a solvent. In other words, a butyl butyrate dispersion of a first polymer, a butyl butyrate solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed through the same operations as in Example 11 with the exception that butyl butyrate was used instead of xylene. The results are shown in Table 3.

Example 18

Operations, measurements, and evaluations were performed in the same way as in Example 14 with the exception that diisobutyl ketone was used instead of xylene as a solvent. In other words, a diisobutyl ketone dispersion of a first polymer, a diisobutyl ketone solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed through the same operations as in Example 14 with the exception that diisobutyl ketone was used instead of xylene. The results are shown in Table 3.

Example 19

Operations, measurements, and evaluations were performed in the same way as in Example 14 with the exception that n-butyl ether was used instead of xylene as a solvent. In other words, an n-butyl ether dispersion of a first polymer, an n-butyl ether solution of a second polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed through the same operations as in Example 14 with the exception that n-butyl ether was used instead of xylene. The results are shown in Table 3.

Comparative Example 1

A xylene solution of a second polymer (binder composition), a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that a first polymer was not produced, and the xylene solution of the second polymer was used as the binder composition. The results are shown in Table 3.

Comparative Example 2

A xylene dispersion of a first polymer (binder composition), a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that a second polymer was not produced, and the xylene dispersion of the first polymer was used as the binder composition. The results are shown in Table 3.

Comparative Example 3

A xylene dispersion of a first polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that a xylene solution of an ester polymer produced as described below was used instead of a xylene solution of a second polymer. The results are shown in Table 3.

<Production of Xylene Solution of Ester Polymer>

A 1 L septum-equipped flask that included a stirrer was charged with 100 parts of deionized water, the gas phase was purged with nitrogen gas, and heating was performed to 70° C. Thereafter, a solution of 0.5 parts of ammonium persulfate (APS) as a polymerization initiator dissolved in 20.0 parts of deionized water was added into the flask.

Meanwhile, a monomer composition was obtained in a separate vessel by mixing 40 parts of deionized water, 1.0 parts of sodium dodecylbenzenesulfonate as an emulsifier, and 55 parts of n-butyl acrylate and 45 parts of ethyl acrylate as ethylenically unsaturated carboxylic acid ester monomers.

The obtained monomer composition was added continuously into the 1 L septum-equipped flask over 2 hours to carry out polymerization. Note that a reaction temperature of 70° C. was maintained during addition of the monomer composition. After addition of the monomer composition, 3 hours of stirring was performed at 80° C., and then the polymerization was ended.

An appropriate amount of xylene was added to the resultant water dispersion of an ester polymer to obtain a mixture. Thereafter, water and excess xylene were removed from the mixture through distillation under reduced pressure at 90° C. to obtain a xylene solution (solid content concentration: 8%) of the ester polymer. Note that the amount of solvent (xylene) insoluble content in the obtained ester polymer was measured, and the ester polymer was confirmed to be highly soluble in the solvent (xylene). The results are shown in Table 3.

Comparative Example 4

A xylene dispersion of a first polymer, a binder composition, a slurry composition for a negative electrode mixed material layer, a slurry composition for a positive electrode mixed material layer, a slurry composition for a solid electrolyte layer, a solid electrolyte layer, a negative electrode, and an all-solid-state secondary battery were produced, and measurements and evaluations were performed in the same way as in Example 1 with the exception that a xylene dispersion of hydrogenated nitrile rubber produced as described below was used instead of a xylene solution of a second polymer. The results are shown in Table 3.

<Production of Xylene Dispersion of Hydrogenated Nitrile Rubber>

A polymerization reaction was performed to obtain a water dispersion of a polymer in the same way as in the procedure described in "Production of xylene solution of second polymer" in Example 1 with the exception that 0.5 parts of ethylene glycol dimethacrylate as a cross-linkable monomer was used as a monomer in addition to 25 parts of acrylonitrile as a nitrile group-containing monomer and 75 parts of 1,3-butadiene as an aliphatic conjugated diene monomer.

The obtained water dispersion of the polymer was then used to perform a hydrogenation reaction in the same way as in the procedure described in "Production of xylene solution of second polymer" in Example 1.

Thereafter, the contents were restored to normal temperature, the system was converted to a nitrogen atmosphere, and then the contents were concentrated to a solid content concentration of 40% using an evaporator to yield a water dispersion of hydrogenated nitrile rubber. The obtained water dispersion of the hydrogenated nitrile rubber was used to measure the chemical composition of the hydrogenated nitrile rubber. The results are shown in Table 3.

In addition, an appropriate amount of xylene was added to the obtained water dispersion of the hydrogenated nitrile rubber to obtain a mixture. Thereafter, water and excess xylene were removed from the mixture through distillation under reduced pressure at 90° C. to obtain a xylene dispersion (solid content concentration: 8%) of the hydrogenated nitrile rubber. Note that the amount of solvent (xylene) insoluble content in the obtained hydrogenated nitrile rubber was measured, and the hydrogenated nitrile rubber was confirmed to be poorly soluble in the solvent (xylene). The results are shown in Table 3.

In Tables 1 to 3, shown below:

"ST" indicates styrene unit;
"2EHA" indicates 2-ethylhexyl acrylate unit;
"EDMA" indicates ethylene glycol dimethacrylate unit;
"AN" indicates acrylonitrile unit;
"BD" indicates 1,3-butadiene unit;
"H-BD" indicates hydrogenated 1,3-butadiene unit;
"BA" indicates n-butyl acrylate unit;
"EA" indicates ethyl acrylate unit;
"MMA" indicates methyl methacrylate unit;
"Amount in slurry" indicates amount (parts by mass) per 100 parts by mass of all solid content in slurry composition for negative electrode mixed material layer;
"DIK" indicates diisobutyl ketone;
"BE" indicates n-butyl ether;
"Leveling performance (negative electrode)" indicates leveling performance of slurry composition for negative electrode mixed material layer; and
"Leveling performance (solid electrolyte)" indicates leveling performance of slurry composition for solid electrolyte layer.

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Binder composition | First polymer:Second polymer (mass ratio) | | | 50:50 | 50:50 | 75:25 | 25:75 | 50:50 | 50:50 | 50:50 | 50:50 |
| | First polymer | Chemical composition [mass ratio] | | ST: 15 2EHA: 85 EDMA: 1 | AN: 15 BA: 40 EA: 45 EDMA: 1 | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 |
| | | Amount of solvent-insoluble content [mass %] | | 90 | 90 | 90 | 90 | 90 | 90 | 90 | 90 |
| | | Property in solvent | | Poorly soluble | Poorly soluble | Poorly soluble | Poorly soluble | Poorly soluble | Poorly soluble | Poorly soluble | Poorly soluble |
| | | Volume-average particle diameter [nm] | | 500 | 450 | 500 | 500 | 500 | 500 | 500 | 500 |
| | Second polymer | Nitrile group-containing monomer unit | Type | AN | AN | AN | AN | AN | AN | AN | AN |
| | | | Proportional content [mass %] | 25 | 25 | 25 | 25 | 25 | 25 | 10 | 28 |
| | | Chemical composition [mass ratio] | | AN: 25 H-BD: 75 | AN: 25 H-BD: 75 | AN: 25 H-BD: 75 | AN: 25 H-BD: 75 | AN: 25 H-BD: 75 | AN: 25 H-BD: 75 | AN: 10 H-BD: 90 | AN: 28 H-BD: 72 |
| | | Amount of solvent-insoluble content [mass %] | | 0 | 0 | 0 | 0 | 0 | 0 | 0 | 0 |
| | | Property in solvent | | Highly soluble | Highly soluble | Highly soluble | Highly soluble | Highly soluble | Highly soluble | Highly soluble | Highly soluble |
| | Solvent | | | Xylene | Xylene | Xylene | Xylene | Xylene | Xylene | Xylene | Xylene |
| Amount in slurry [parts by mass] | | | First polymer | 1 | 1 | 1.5 | 0.5 | 2 | 0.5 | 1 | 1 |
| | | | Second polymer | 1 | 1 | 0.5 | 1.5 | 2 | 0.5 | 1 | 1 |
| Lithium ion conductivity | | | | A | A | A | B | C | A | A | A |
| Leveling performance (negative electrode) | | | | A | A | B | A | A | B | B | B |
| Leveling performance (solid electrolyte) | | | | A | A | B | A | A | B | B | B |
| Output characteristics | | | | A | A | B | B | B | B | B | B |

TABLE 2

| | | | | Example 9 | Example 10 | Example 11 | Example 12 | Example 13 | Example 14 | Example 15 |
|---|---|---|---|---|---|---|---|---|---|---|
| Binder composition | First polymer:Second polymer (mass ratio) | | | 50:50 | 50:50 | 50:50 | 50:50 | 50:50 | 50:50 | 50:50 |
| | First polymer | Chemical composition [mass ratio] | | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 |
| | | Amount of solvent-insoluble content [mass %] | | 90 | 90 | 90 | 90 | 90 | 90 | 90 |
| | | Property in solvent | | Poorly soluble | Poorly soluble | Poorly soluble | Poorly soluble | Poorly soluble | Poorly soluble | Poorly soluble |
| | | Volume-average particle diameter [nm] | | 500 | 500 | 500 | 500 | 500 | 500 | 500 |
| | Second polymer | Nitrile group-containing monomer unit | Type | AN | AN | AN | AN | AN | AN | AN |
| | | | Proportional content [mass %] | 3 | 35 | 20 | 20 | 20 | 20 | 20 |
| | | Chemical composition [mass ratio] | | AN: 3 H-BD: 97 | AN: 35 H-BD: 65 | AN: 20 H-BD: 60 BA: 20 | AN: 20 BD: 80 | AN: 20 BD: 60 BA: 20 | AN: 20 BA: 45 EA: 35 | AN: 20 2EHA: 40 MMA: 40 |
| | | Amount of solvent-insoluble content [mass %] | | 0 | 0 | 0 | 0 | 0 | 0 | 0 |
| | | Property in solvent | | Highly soluble | Highly soluble | Highly soluble | Highly soluble | Highly soluble | Highly soluble | Highly soluble |
| | Solvent | | | Xylene | Xylene | Xylene | Xylene | Xylene | Xylene | Xylene |
| Amount in slurry [parts by mass] | | | First polymer | 1 | 1 | 1 | 1 | 1 | 1 | 1 |
| | | | Second polymer | 1 | 1 | 1 | 1 | 1 | 1 | 1 |
| Lithium ion conductivity | | | | B | B | A | A | A | A | A |
| Leveling performance (negative electrode) | | | | C | C | AA | A | AA | A | A |
| Leveling performance (solid electrolyte) | | | | C | C | A | A | A | A | A |
| Output characteristics | | | | B | B | A | A | A | A | A |

TABLE 3

| | | | | Example 16 | Example 17 | Example 18 | Example 19 | Comparative Example 1 | Comparative Example 2 | Comparative Example 3 | Comparative Example 4 |
|---|---|---|---|---|---|---|---|---|---|---|---|
| Binder composition | First polymer:Second polymer (mass ratio) | | | 50:50 | 50:50 | 50:50 | 50:50 | 0:100 | 100:0 | 50:50 | 50:50 |
| | First polymer | Chemical composition [mass ratio] | | ST: 15 2EHA: 85 EDMA: 1 | ST: 15 2EHA: 85 EDMA: 1 | ST: 15 2EHA: 85 EDMA: 1 | ST: 15 2EHA: 85 EDMA: 1 | — | ST: 15 2EHA: 85 EDMA: 1 | ST: 15 2EHA: 85 EDMA: 1 | ST: 15 2EHA: 85 EDMA: 1 |
| | | Amount of solvent-insoluble content | | 90 | 90 | 90 | 90 | — | 90 | 90 | 90 |
| | | Property in solvent | | Poorly soluble | Poorly soluble | Poorly soluble | Poorly soluble | — | Poorly soluble | Poorly soluble | Poorly soluble |
| | | Volume-average particle diameter [nm] | | 500 | 500 | 500 | 500 | — | 500 | 500 | 500 |
| | Second polymer | Nitrile group-containing monomer unit | Type | AN | AN | AN | AN | AN | — | — | AN |
| | | | Proportional content [mass %] | 25 | 20 | 20 | 20 | 24 | — | — | 25 |
| | | Chemical composition [mass ratio] | | AN: 25 H-BD: 75 | AN: 20 H-BD: 60 BA: 20 | AN: 20 BA: 45 EA: 35 | AN: 20 BA: 45 EA:35 | AN: 24 H-BD: 76 | — | BA: 55 EA: 45 | AN: 25 H-BD: 75 EDMA: 0.5 |
| | | Amount of solvent-insoluble content | | 0 | 0 | 0 | 0 | 0 | — | 0 | 55 |
| | | Property in solvent | | Highly soluble | Highly soluble | Highly soluble | Highly soluble | Highly soluble | — | Highly soluble | Poorly soluble |
| | Solvent | | | Butyl butyrate | Butyl butyrate | DIK | BE | Xylene | Xylene | Xylene | Xylene |
| Amount in slurry [parts by mass] | | | First polymer | 1 | 1 | 1 | 1 | 0 | 2 | 1 | 1 |
| | | | Second polymer | 1 | 1 | 1 | 1 | 2 | 0 | 1 | 1 |
| Lithium ion conductivity | | | | A | A | B | B | D | D | C | D |
| Leveling performance (negative electrode) | | | | A | AA | B | B | D | D | C | D |
| Leveling performance (solid electrolyte) | | | | A | A | B | B | D | D | C | D |
| Output characteristics | | | | A | A | B | B | D | C | C | D |

It can be seen from Tables 1 to 3 that it was possible to produce a slurry composition for a solid electrolyte-containing layer having excellent leveling performance, a solid electrolyte layer having excellent lithium ion conductivity, and an all-solid-state secondary battery having excellent output characteristics in Examples 1 to 19 in which the used binder composition contained a first polymer, a second polymer, and a solvent, the first polymer was poorly soluble in the solvent, and the second polymer included a nitrile group-containing monomer unit and was highly soluble in the solvent.

Moreover, it can be seen from Table 3 that leveling performance of a slurry composition for a solid electrolyte-containing layer, lithium ion conductivity of a solid electrolyte layer, and output characteristics of an all-solid-state secondary battery deteriorated in Comparative Examples 1 and 2 in which the used binder composition did not contain the first polymer described above or did not contain the second polymer described above. It can also be seen from Table 3 that output characteristics of an all-solid-state secondary battery deteriorated in Comparative Example 3 in which an ester polymer that did not include a nitrile group-containing monomer unit was used instead of the second polymer described above. It can also be seen from Table 3 that leveling performance of a slurry composition for a solid electrolyte-containing layer, lithium ion conductivity of a solid electrolyte layer, and output characteristics of an all-solid-state secondary battery deteriorated in Comparative Example 4 in which hydrogenated nitrile rubber that was poorly soluble in the solvent was used instead of the second polymer.

INDUSTRIAL APPLICABILITY

According to the present disclosure, it is possible to provide a binder composition for an all-solid-state secondary battery with which it is possible to produce a slurry composition for a solid electrolyte-containing layer having good leveling performance and to form a solid electrolyte-containing layer that can cause an all-solid-state secondary battery to display excellent output characteristics.

Moreover, according to the present disclosure, it is possible to provide a slurry composition for an all-solid-state secondary battery electrode mixed material layer that has good leveling performance and with which it is possible to form an electrode mixed material layer that can cause an all-solid-state secondary battery to display excellent output characteristics.

Furthermore, according to the present disclosure, it is possible to provide a slurry composition for an all-solid-state secondary battery solid electrolyte layer that has good leveling performance and with which it is possible to form a solid electrolyte layer that can cause an all-solid-state secondary battery to display excellent output characteristics.

Also, according to the present disclosure, it is possible to provide an electrode for an all-solid-state secondary battery and a solid electrolyte layer for an all-solid-state secondary battery that can cause an all-solid-state secondary battery to display excellent output characteristics.

Moreover, according to the present disclosure, it is possible to provide an all-solid-state secondary battery having excellent output characteristics.

The invention claimed is:

1. A binder composition for an all-solid-state secondary battery comprising a first polymer, a second polymer, and a solvent, wherein the first polymer is a copolymer that is poorly soluble in the solvent and includes an ethylenically unsaturated carboxylic acid ester monomer unit and a cross-linkable monomer unit, and the second polymer is a copolymer that is highly soluble in the solvent, the copolymer that is highly soluble in the solvent being a polymer that includes a nitrile group-containing monomer unit and an ethylenically unsaturated carboxylic acid ester monomer unit but does not include an aliphatic conjugated diene monomer unit and a hydrogenated product thereof.

2. The binder composition for an all-solid-state secondary battery according to claim 1, wherein the first polymer constitutes a proportion of not less than 10 mass % and not more than 90 mass % among a total of the first polymer and the second polymer.

3. The binder composition for an all-solid-state secondary battery according to claim 1, wherein the solvent includes either or both of xylene and butyl butyrate.

4. A slurry composition for an all-solid-state secondary battery electrode mixed material layer comprising: a solid electrolyte; an electrode active material; and the binder composition for an all-solid-state secondary battery according to claim 1.

5. A slurry composition for an all-solid-state secondary battery solid electrolyte layer comprising: a solid electrolyte; and the binder composition for an all-solid-state secondary battery according to claim 1.

6. An electrode for an all-solid-state secondary battery comprising an electrode mixed material layer formed using the slurry composition for an all-solid-state secondary battery electrode mixed material layer according to claim 4.

7. A solid electrolyte layer for an all-solid-state secondary battery formed using the slurry composition for an all-solid-state secondary battery solid electrolyte layer according to claim 5.

8. An all-solid-state secondary battery comprising the electrode for an all-solid-state secondary battery according to claim 6.

9. An all-solid-state secondary battery comprising the solid electrolyte layer for an all-solid-state secondary battery according to claim 7.

10. A binder composition for an all-solid-state secondary battery comprising a first polymer, a second polymer, and a solvent, wherein the first polymer is a copolymer that is poorly soluble in the solvent and includes an ethylenically unsaturated carboxylic acid ester monomer unit and a cross-linkable monomer unit, and a proportional content of the cross-linkable monomer unit is in a range of 0.01 mass % or more and 5 mass % or less, and the second polymer is a copolymer that is highly soluble in the solvent, the copolymer that is highly soluble in the solvent being a polymer that includes a nitrile group-containing monomer unit and an ethylenically unsaturated carboxylic acid ester monomer unit but does not include an aliphatic conjugated diene monomer unit and a hydrogenated product thereof.

* * * * *